(12) United States Patent
Ronen et al.

(10) Patent No.: US 12,373,612 B2
(45) Date of Patent: Jul. 29, 2025

(54) SYSTEM, METHOD AND COMPUTER PROGRAM PRODUCT FOR EFFICIENT DESIGN OF BUILDINGS

(71) Applicant: Wall to Wall, LLC, Hayward, CA (US)

(72) Inventors: Noam Ronen, Be'er Tuvia (IL); Ofir Baruch Chaim Strull, Tel Aviv (IL); Tamar Shani Luzon, Tel Aviv (IL); Tamar Yaniv, Ramat HaSharon (IL)

(73) Assignee: Wall to Wall, LLC, Hayward, CA (US)

( * ) Notice: Subject to any disclaimer, the term of this patent is extended or adjusted under 35 U.S.C. 154(b) by 1035 days.

(21) Appl. No.: 17/306,538

(22) Filed: May 3, 2021

(65) Prior Publication Data

US 2022/0350938 A1 Nov. 3, 2022

(51) Int. Cl.
*G06F 30/12* (2020.01)
*G06F 30/13* (2020.01)

(52) U.S. Cl.
CPC .............. *G06F 30/12* (2020.01); *G06F 30/13* (2020.01)

(58) Field of Classification Search
CPC .. G06F 30/13; G06F 2111/18; G06F 2111/20; G06F 2113/14; G06F 2113/16; G06F 30/12; G06F 30/18
See application file for complete search history.

(56) References Cited

U.S. PATENT DOCUMENTS

| | | | |
|---|---|---|---|
| 2011/0054652 A1 | 3/2011 | Heil | |
| 2020/0089819 A1* | 3/2020 | Gauderis | G06T 17/10 |
| 2021/0383033 A1* | 12/2021 | Glenn | E04B 1/34315 |

FOREIGN PATENT DOCUMENTS

| | | |
|---|---|---|
| CN | 112252548 A | 1/2021 |
| EP | 3432172 A1 | 1/2019 |
| EP | 3796202 A | 3/2021 |
| WO | 2019240597 A1 | 12/2019 |

(Continued)

OTHER PUBLICATIONS

Bimsmith, "How to Create Complex Wall Types in Revit," retrieved (https://bimsmith.com/newmybimsmith/register?returnurl=https://blog.bimsmith.com/how-tocreate-complex-wall-types-in-revit), (2020) (Year: 2020).*

(Continued)

*Primary Examiner* — Rehana Perveen
*Assistant Examiner* — John David Hagler
(74) *Attorney, Agent, or Firm* — Morrison & Foerster LLP

(57) ABSTRACT

A method for designing buildings, the method comprising providing a digital representation of how M walls are relatively positioned, thereby to define a digital building geometry, wherein each wall typically belongs to a wall type selected from among N1 possible layered wall types, and/or using a hardware processor for classifying at least one portion of the building geometry, which includes at least portions of each of at least one e.g. plural walls respectively, as an individual junction aka engagement location between the plural walls belonging to one of J possible junction types; and/or detailing said individual junction including providing digital representations of each of said plural portions of said plural walls respectively, to yield said individual junction, thereby to allow the building geometry to be constructed, once the M walls have been manufactured.

10 Claims, 34 Drawing Sheets

(56) References Cited

FOREIGN PATENT DOCUMENTS

WO 2020012484 A2 1/2020

OTHER PUBLICATIONS

Markus Lipp et al: "Interactive visual editing of grammars for procedural architecture", ACM Transactions on Graphics, ACM, NY, US, vol. 27, No. 3, Aug. 1, 2008 (Aug. 1, 2008), pp. 1-10, XP058355395, ISSN: 0730-0301, DOI: 10.1145/1360612.1360701.

Building information modeling, downloaded from https://de.wikipedia.org/w/index.php?title=Building_Information_Modeling&oldid=226646528 (Apr. 14, 2021).

Edit Wall Joins tool downloaded from https://forums.augi.com/showthread.php?6145-Edit-Wall-Joins-tool, Oct. 20, 2005.

RevitCity downloaded from https://www.revitcity.com/forums.php?action=viewthread&thread_id=2309 (2015.

Cut a Shaft Opening downloaded from https://knowledge.autodesk.com/support/revit-products/learnexplore/caas/CloudHelp/cloudhelp/2018/ENU/Revit-Model/files/GUID-FA0CF7B6-D3E1-4F58-AE02-A19457BBCD02-htm.html#:~:text=Use%20the%20Shaft%20tool%20to,lines%20or%20by%20picking%20walls., Jul. 21, 2022.

Revit Facade downloaded from http://wiki.bk.tudelft.nl/mw_toi-pedia/index.php?title=Revit_Facade&oldid=27251, TOI-Pedia (tudelft.nl), retrieved on Sep. 1, 2022.

Nicolas Catellier, 8 Tips To Understand Revit Wall Joins—Revit Pure, Feb. 22, 2019.

Van Dijk et al., From Revit Model to Production: A Detailed Lookinto the Workflow at Voorbij Prefab, downloaded https://www.autodesk.com/autodesk-university/article/Revit-Model-Production-Detailed-Look-Workflow-Voorbij-Prefab-2020, retrieved on Sep. 1, 2022.

Place a Wall downloaded from https://help.autodesk.com/view/RVT/2021/ENU/?guid=GUID-05BAFEAA-5186-484E-80F4-8D900C454748, (2021).

Quiroga, R. Q., Kreuz, T., & Grassberger, P. (2002). Event synchronization: a simple and fast method to measure synchronicity and time delay patterns. Physical review E, 66(4), 041904.

\* cited by examiner

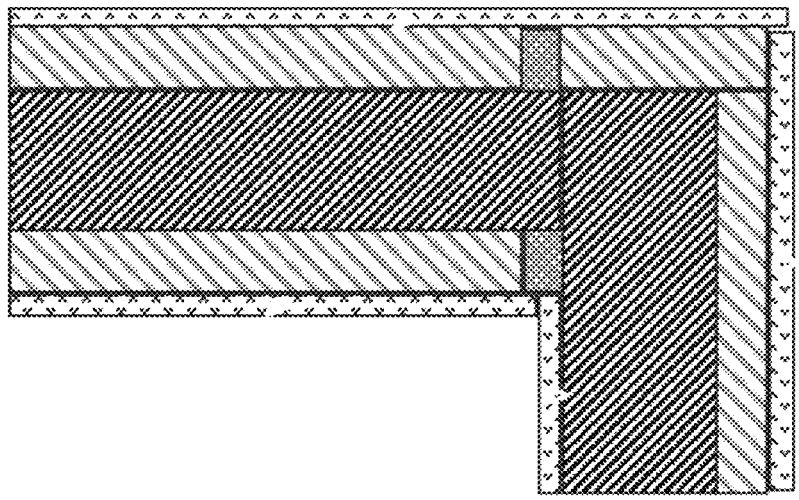
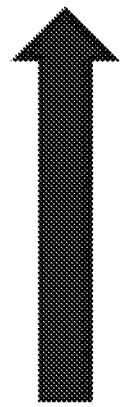
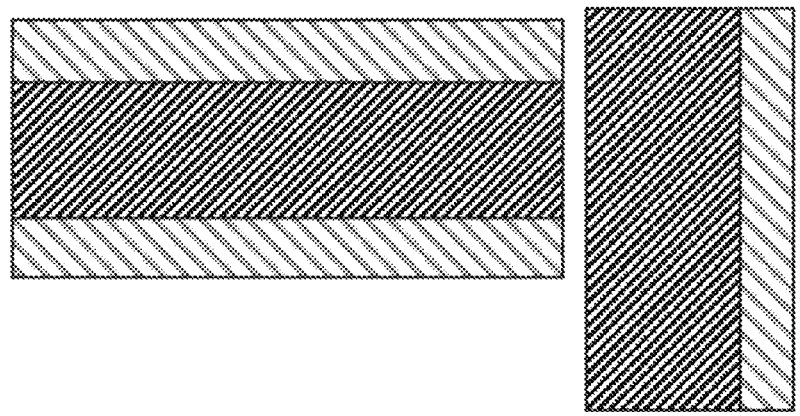
Fig. 7

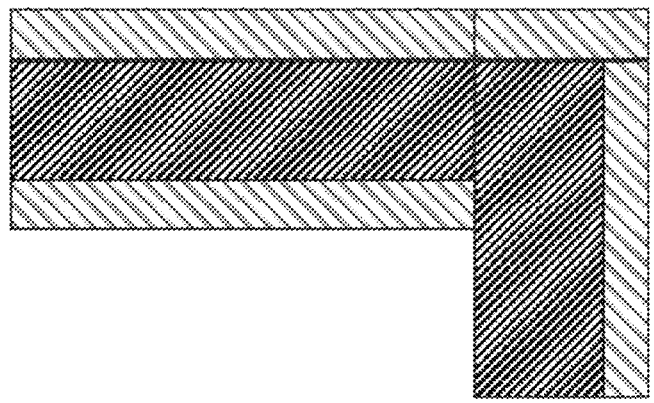
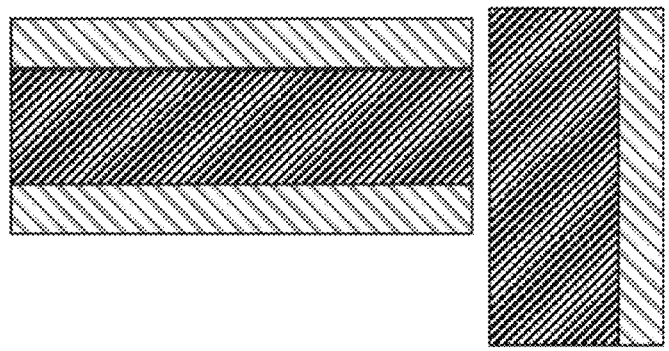
Fig. 9

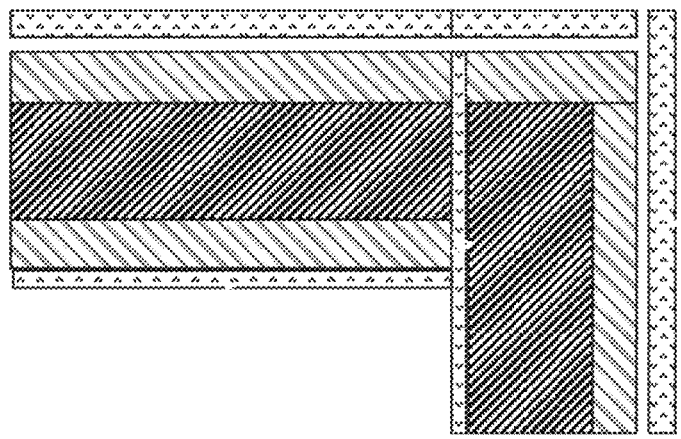
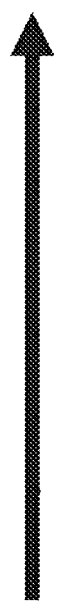
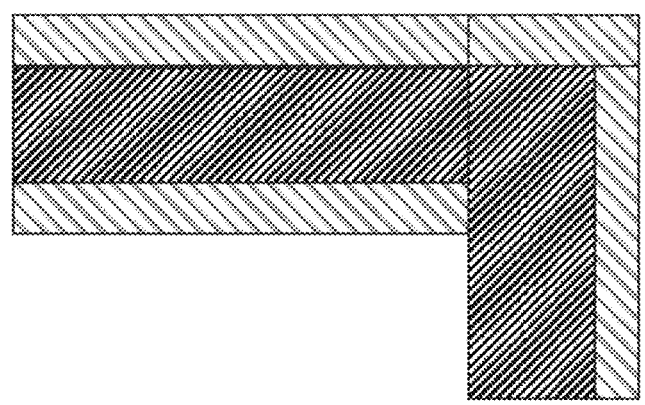
Fig. 19

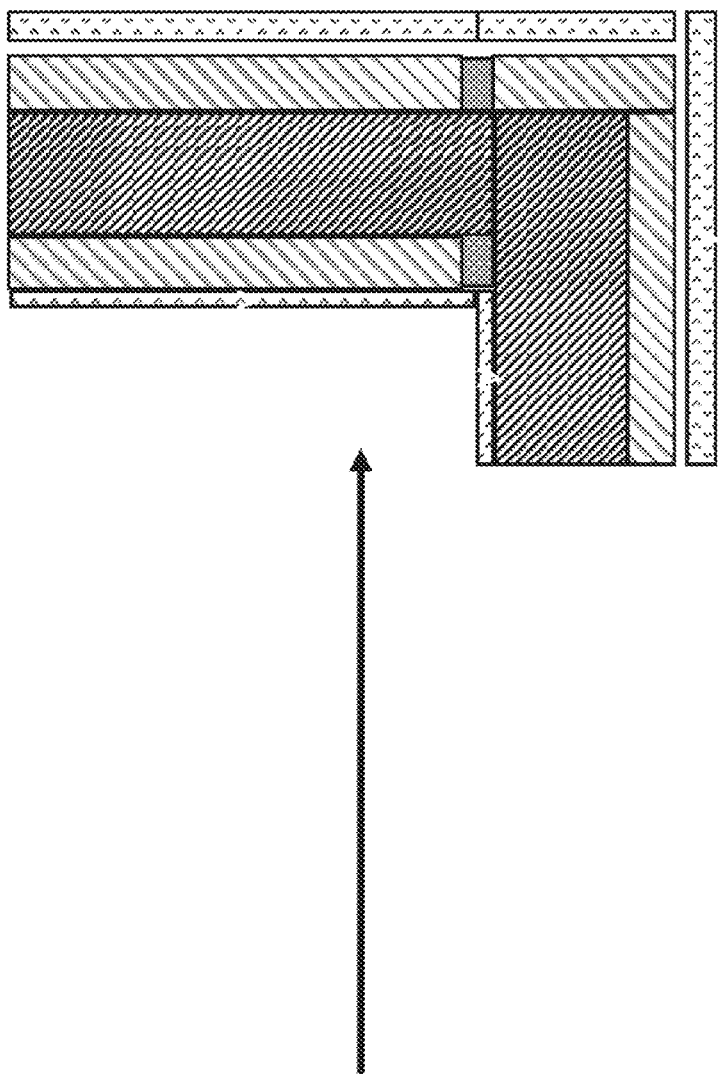
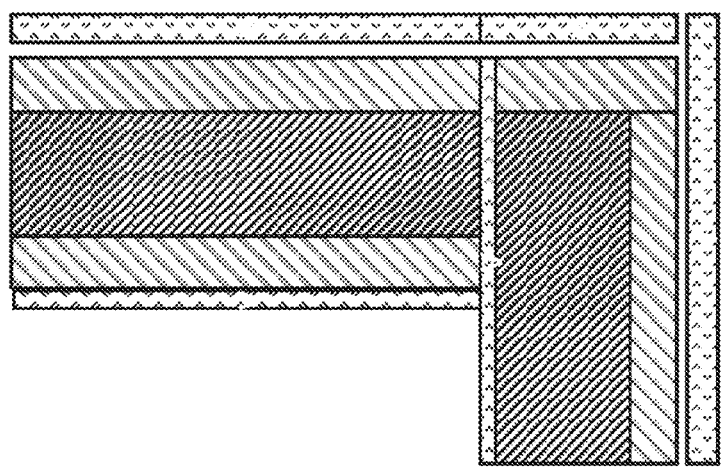
Fig. 25

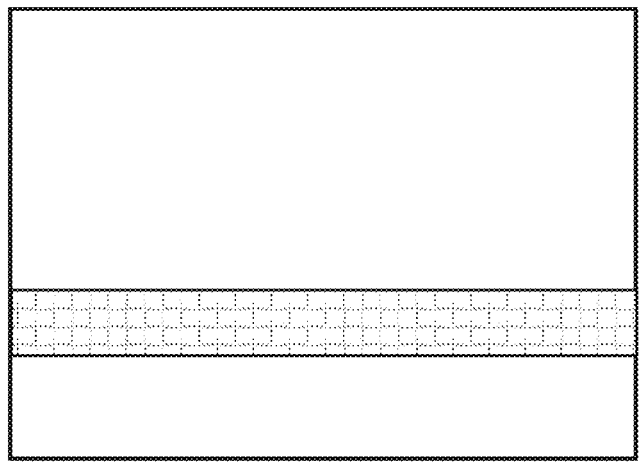
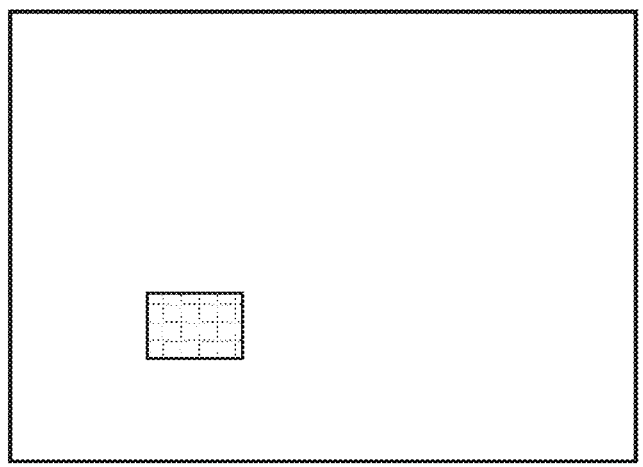
Fig. 27

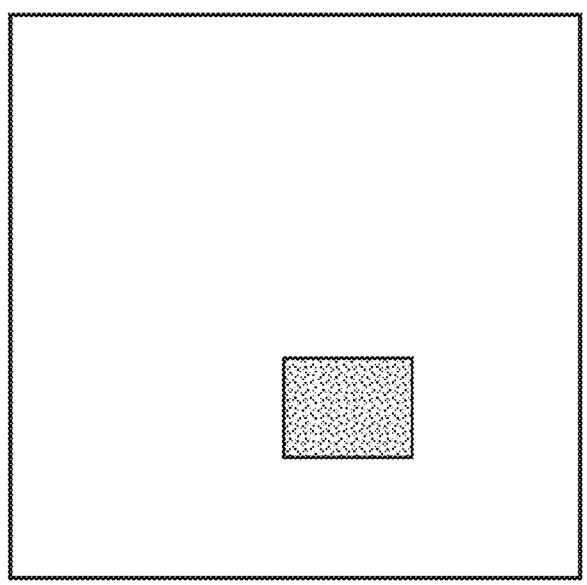
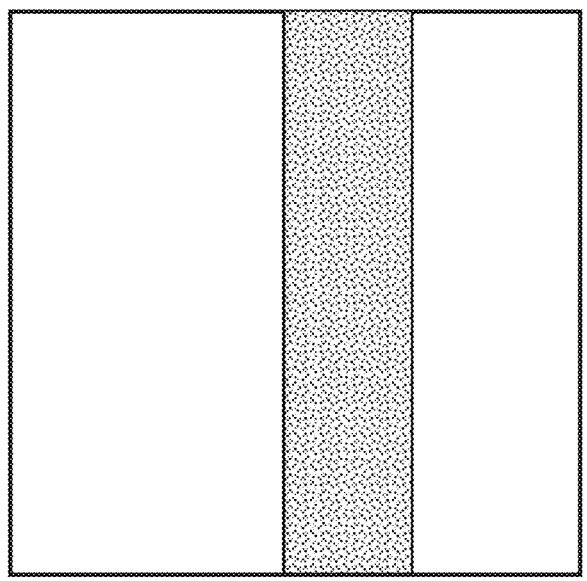
Fig. 28

Stage 0. System user roughly positions walls; typically each wall is selected by the user from a pre-fixed or pre-determined set of wall types

↓

Stage 1, sub-stage 1.10: identify wall junctions in file which shows rough positioning of walls. typically define each junction as an entry in a table or other data structure. Duplicates are typically erased. Typically, each wall junction is defined as belonging to one of a predetermined set of wall junction types or corners

↓

Stage 1, sub-stage 1.20. Determination of the number of walls in a corner

↓

Stage 1, sub-stage 1.30. Identification of connection type aka corner type and alignment. Typically identify each wall's "role" (penetrating or "penetration" walls vs. "master" walls which are penetrated, e.g.).

↓

Stage 2, Operation 2010: Retrieve wall type/ property

↓

Stage 2, Operation 2020: add finish layers to wall/s

↓

Stage 3. Add CAD families to each identified or created corner

Fig. 32

SYSTEM, METHOD AND COMPUTER PROGRAM PRODUCT FOR EFFICIENT DESIGN OF BUILDINGS

FIELD OF THIS DISCLOSURE

The present invention relates generally to construction of buildings, and more particularly to the designing stages of construction.

BACKGROUND FOR THIS DISCLOSURE

Published PCT patent application WO2020012484 patentscope.wipo.int/search/en/detail.jsf?docId=WO2020012484 describes a prefabricated construction wall assembly; this may be used for example for constructing using layered walls e.g. as described herein.

Revit is an example of widely used building design software. Herein, the Revit terminology and paradigm are used merely by way of example since applicability of the embodiments herein is not limited to Revit specifically. Other alternative software packages are ArchiCAD and Sketchup, for example. More generally, Autodesk Revit is an example of BIM (ei.wikipedia.org/wiki/Building_information_modeling—building information modelling software) or of a CAD software package, for architects and other building professionals.

Revit has a wall tool as well as an "edit wall joins tool" which has been criticized, e.g. in forum discussions here: forums.augi.com/showthread.php?6145-Edit-Wall-Joins-tool and here:
206.225.0.11/
forums.php?action=viewthread&thread_id=2309.

Autodesk allows an end-user to "use the Shaft tool to place an opening that extends through the entire height of a building (or through selected levels), cutting through the faces of roofs, floors, or ceilings simultaneously", e.g. as described in the following https link: knowledge.autodesk-.com/support/revit-products/learn-explore/caas/CloudHelp/cloudhelp/2018/ENU/Revit-Model/files/GUID-FA0CF7B6-D3EI-4F58-AE02-A19457BBCD02-htm.html#:~:text=Use%20the%20Shaft%20tool%20to,lines20or%20by%20picking%20walls.

In Revit, "Walls are normally built up out of different layers. In the type properties under structure you can set the material, thickness and function of these layers . . . . When walls and floors are joined, certain rules for joining apply that define how the different layers meet and intersect. Structure layers have the highest priority (1), finish has the lowest priority (5) . . . . Revit connects layers with the highest priority first before connecting layers with a lower priority. The core layers pass through everything, even if there are layers in the core with a lower priority than the layers outside the core."(Revit Facade—TOI-Pedia (tudelft.nl)). The joins that Revit proposes to end-users by default have been termed "bizarre, diagonal, odd-shaped" (8 Tips To Understand Revit Wall Joins—REVIT PURE).

Smart Walls is an add-on for managing walls in Autodesk® Revit®, which inter alia "fully control joins".

This link www.autodesk.com/autodesk-university/article/Revit-Model-Production-Detailed-Look-Workflow-Voorbij-Prefab-2020 describes a software solution for clients seeking to automate building design processes, stating inter alia, that "In some cases, models from other disciplines are used, for example anchors for scaffolding or connections with steel structures. In general, every component that is desired to be produced in the wall elements should be part of the model input. The models of the different disciplines are the direct input for the engineering process. They are filtered and combined by Voorbij Prefab without modification. The combined model is then enriched with all the necessary components for production (e.g., wall connections, lifters, bracing inserts, rebar, etc.). the publication describes that "all components necessary for the structural integrity will be modeled (wall connections, floor connections, etc.) . . . . To make a connection with the roof there are anchors needed, and this connection may, e.g. also, act as a structural connection. A Dynamo script will place the anchors according to the standard Voorbij method. This method has been calculated and the method is shared with all clients. If for some reason the client wants to have another anchor distribution, the client will be asked to add the anchors in the model themselves". The publication further describes that "Every family in Revit is mapped with an object in the CCAD software. Based on customizable settings CCAD will automatically add . . . Wall connections. Production sheets are produced including dimensions and a Unitechnik file is created for controlling the robots and ERP system."

Published PCT application WO2020012484, co-owned, describes a prefabricated construction wall assembly.

The disclosures of all publications and patent documents mentioned in the specification, and of the publications and patent documents cited therein directly or indirectly, are hereby incorporated by reference other than subject matter disclaimers or disavowals. If the incorporated material is inconsistent with the express disclosure herein, the interpretation is that the express disclosure herein describes certain embodiments, whereas the incorporated material describes other embodiments. Definition/s within the incorporated material may be regarded as one possible definition for the term/s in question.

SUMMARY OF CERTAIN EMBODIMENTS

Certain embodiments of the present invention seek to provide circuitry typically comprising at least one processor in communication with at least one memory, with instructions stored in such memory executed by the processor to provide functionalities which are described herein in detail. Any functionality described herein may be firmware-implemented or processor-implemented, as appropriate.

Throughout the architectural design procedure of buildings, even when using CAD software, there are some tasks and processes which are repetitive, time consuming and prone to errors. These issues are further amplified when the wall itself is a multilayered system (e.g., wall panels) on its own, hence connecting walls may actually involve connecting between at least two systems. This connection may follow some strict functional guidelines, hence complicating the design process. Certain embodiments seek to facilitate an automation process of wall detailing. This task will typically include at least two main operational stages, such as finish placement and corner creation. By automating these operations, an architect can perform such tasks more efficiently and in a shorter timeframe, hence facilitating the architect's handling of the wall panels modeling process, while saving time, preventing human error, and rendering the process more accurate and reliable.

Certain embodiments seek to provide a detailing process e.g. when 1 or 2 or more walls are connected together, typically forming a corner. Typically, the system includes identifying the potential of such a connection or a desired connection, e.g. when walls are located in sufficiently close proximity. Typically, the walls are prepared for a main detailing process e.g. by applying adjustments, such as alignment.

Certain embodiments seek to provide improved software-based tool-kits which automate the process of wall detailing in Computer Aided Design (CAD).

Certain embodiments seek to provide a wall detailer tool which typically details portions of the wall, depending on junctions at which the wall is intended to be included or have a certain function.

Certain embodiments seek to provide Artificial Intelligence which may augment or replace the human capability to identify a corner. For example, as described herein, intelligent software may create a bounding box, and then test for overlap e.g. as described herein with reference to FIG. 12.

Current CAD systems (such as REVIT by Autodesk) facilitate complex building design efforts, but typically focus on digitization of the drawings. They may seek to serve as a digital tool, replacing the traditional "pencil and paper" techniques which translate the design outcome itself to electronic files. Throughout the process itself, most of the automation capabilities are focused on defining and reusing different modules and components whose use is repeated to some extent throughout the complete design process.

According to certain embodiments herein, the wall itself may be treated as a system on its own, and attaching or placing walls of a building typically does not involve mere geometrical positioning. The walls may be required to interface with each other, depending on the different wall functions. For example, a wall may include an internal layer which may provide protection against fire hazards, and/or another internal layer which may serve as some form of acoustic insulation. When attaching two or more walls, it may be required that some continuity of the internal layers may re-connect for preserving fire safety requirements, or eliminating acoustic insulation breaches. In contrast, CAD software typically does not provide inherent awareness about such systems or their associated requirements, relegating tedious design work to the architect or designer, who would need to perform these tasks manually.

Conventionally, existing CAD systems may require the following:

In the first phase, the architect may be required to place the wall finishes according to their type: exterior side or interior side, lock and join them to the stud wall component, and adjust their height.

After placing the finishes, the architect may need to detail wall panels' intersections. Such an operation includes identifying the walls' intersection category and implementing desired families, and locking and joining them to the stud wall component, and adjusting their height.

Eventually, a model checkup may need to be performed to verify that walls are molded correctly in order to apply the operation.

Certain embodiments herein provide automated processes which obviate at least a portion of these manual, technical, time consuming operations for a wide variety of potential end-users, such as but not limited to architects and designers, construction companies, interior designers and engineers.

The following terms may be construed either in accordance with any definition thereof appearing in the prior art literature or in accordance with the specification, or to include in their respective scopes, the following:

CAD/CAM: may include computer aided design/modelling.

Penetrating wall: may include a wall that has an end that, if elongated, may penetrate a second wall perpendicular to the penetrating wall.

Master wall: may include a wall that may be identified as one which may be penetrated by a "penetrating wall" if the penetrating wall is elongated or extended.

Adjacent wall: may include a wall that continues a "Master wall" in a corner.

Stud e.g. LGS stud: may include a typically light-gauge-steel aka LGS vertical core layer, which may be used to create the structural frame of a steel wall assembly. Technology which may be used to provide this stud is described in Published PCT application WO2020012484, co-owned, the disclosure of which is hereby incorporated by reference.

Fire-rated wall: may include a wall that is rated to hinder the spread of fire for X hours e.g. as defined by local code requirements.

Wall family: may include a CAD architectural "family" of a finite number of wall types for use in a project model e.g. as shown in FIG. 2.

Wall-finish family: may include a CAD architectural "family" of a finite number of wall-finish types for placing on walls in the project model e.g. as shown in FIG. 3.

Penetration family: may include a CAD architectural "family" of a finite number of elements which are cuts and openings in walls' finish for connecting to other walls by allowing them to penetrate each other or to prevent finish overlap, e.g. as shown in FIG. 4.

Void family: may include a CAD architectural "family" of finite elements that includes studs or sleeves or more generally objects that are supposed to create openings at corners, and instead place objects with a dedicated function such as: fire-blocks, sound proofing, thermal barriers and more, e.g. as shown in FIG. 5.

It is appreciated that families e.g. penetration and void families described herein need not respectively comprise default families that exist in CAD CAM software. Each family may comprise any group of objects having similarities that are then re-used many times, e.g. serving as detailing tools for corners and connections or structural elements e.g. studs or sleeves, that may join walls at corners. Each family of 3D objects can be created locally, or may be imported for use from external software. "Grouping" (in CAM): may include an action which logically connects objects for assigning transformations and making instances. For instance, should there be a window comprised of a frame and glass, grouping them to a "window" may allow all of these to be transformed together.

"Joining" (in CAM): may include an action which associates certain elements, as though they were physically connected.

For example, if elements that share a common face are "joined", this allows certain geometric actions to take place, such as removing the dividing line between the elements, or allowing hosted items to be reflected on the joined element. For instance, if a window is placed in a wall and a finish layer is "joined" to the wall, an opening for the window may automatically be created in the finish layer (as well as in the wall). This may be the case also if a wall penetrating object other than a window is placed on the wall, where, originally the window positioning would have cut an opening in the wall automatically, even absent the joining, but once the finish is joined to the wall, the wall and finish may behave as a single object, and the window may cut an opening in both of them. Joining also helps save time for later "manual" additions.

"Locking" (in CAM): may include an action of constraining elements to each other so that they maintain a certain relationship between them, for example, different walls that are aligned and locked together remain so until the lock is removed, even when one of them is moved, and the other is not.

Corner aka junction: may include any connection of two or more walls, typically including even two walls connecting end-to-end to yield a longer wall. May include a classification of the geometry in the vicinity of an end of a wall including which other wall portions are within that vicinity and how are they arranged within that vicinity. For example, a given wall-end may be included in, or participate in, a corner such as an l-corner or t-corner. Or, a wall-end's vicinity may not include any portion of any wall, other than the wall-end itself (e.g. the protruding end of a half-wall). It is appreciated that a wall portion which is not an end may participate or be included in certain junctions (e.g. T-junctions) however, typically, each junction is within a vicinity of, and includes, at least one wall-end.

Wall-end: may include a portion of a wall which is adjacent to an end of the wall.

Scaling: may include increasing or decreasing one or more dimensions of an object's size; the object may be 3 dimensional or 2 dimensional, or even one-dimensional. Scaling may or may not be "uniform".

It is appreciated that any reference herein to, or recitation of, an operation being performed, e.g. if the operation is performed at least partly in software, is intended to include both an embodiment where the operation is performed in its entirety by a server A, and also to include any type of "outsourcing" or "cloud" embodiments in which the operation, or portions thereof, is or are performed by a remote processor P (or several such), which may be deployed off-shore or "on a cloud", and an output of the operation is then communicated to, e.g. over a suitable computer network, and used by, server A. Analogously, the remote processor P may not, itself, perform all of the operations, and, instead, the remote processor P itself may receive output/s of portion/s of the operation from yet another processor/s P', may be deployed off-shore relative to P, or "on a cloud", and so forth.

The present invention thus typically includes at least the following embodiments:

Embodiment 1. A method for designing buildings,
the method comprising all or any subset of the following:
a. providing a digital representation of how M walls are relatively positioned, thereby to define a digital building geometry, wherein each wall belongs to a wall type selected from among N1 possible layered wall types;
b. using a hardware processor for classifying at least one portion of the building geometry, which includes at least portions of each of at least one e.g. plural walls respectively, as an individual junction aka engagement location between the plural walls belonging to one of J possible junction types; and
c. detailing the individual junction including providing digital representations of each of the plural portions of the plural walls respectively, to yield the individual junction, thereby to allow the building geometry to be constructed, once the M walls have been manufactured.

It is appreciated that some junctions, such as a half-wall, may include but a single wall. A typical room-corner is a junction which includes 2 walls (one can also say that 2 walls "participate" in the corner junction).

Typically, a finite and preferably relatively small number of wall types and of junctions are defined, globally or for each building project and/or for each manufacturing facility. For example, less than 20 or less than 10 wall types and less than 20 or less than 10 junction types. Typically, all walls belonging to a single wall type have the same number of layers (1 or more), which typically are provided in the same order or sequence, and/or each layer has the same thickness, and/or is made of the same materials, for all walls belonging to a single wall type.

Each building project may include thousands or tens of thousands or more of residential or other housing units.

It is appreciated that the plural portions of the plural walls which together belong to one of the J possible junction types may interact with one another in any known manner. For example, the wall portions may touch or almost touch one another, may overlap with one another, may engage with one another, may dovetail, may join in any suitable manner (e.g. may be butt joined, or any other joint such as but not limited to a Dado Joint, Dowel Joint, Lap Joint, Miter Joint, Mortise-and-Tenon Joint, Through-Dovetail Joint, Tongue-and-Groove Joint), may interlock, may snap-fit one another, and may each interact in any of the above manners with a separate physical member, or with respective physical members which interact in any of the above manners with one another, thereby to indirectly interact with one another via a chain of one or more interacting physical members, the first of which interacts with one of the plural walls, and the last of which interacts with another of the plural walls. Each physical member may, for example, be a member of a Revit void family. Typically, the walls are physically brought into interaction with one another using any suitable method for securing the walls to each other or to any other element such as a floor, ceiling, member of a void family, etc., such as but not limited to any of the above methods, but typically, the method does not use materials (e.g. concrete, mortar, plaster) which are installed or applied in other than a dry condition.

Embodiment 2. A method according to any of the preceding embodiments wherein the detailing comprises selecting digital representations of each of the plural portions of the plural walls respectively from a repository of wall portion digital representations, the repository including,
for each individual junction type from among the J possible junction types and for each individual wall type from among the N1 possible layered wall types,
a digital representation of a first portion of the individual wall type
and N2 digital representations, of each of N2 possible second portions, of walls whose types are selected from among the N2 possible layered wall types respectively, and wherein each of the N2 possible second portions is configured to interlock, directly or indirectly, with at least the first portion of the individual wall type to yield a junction of the individual junction type.

Embodiment 3. A method according to any of the preceding embodiments and also comprising manufacturing each of the plural walls in accordance with the digital representations, thereby to allow the building geometry to be constructed by interlocking the plural portions.

Embodiment 4. A method according to any of the preceding embodiments wherein the repository includes, for at least one junction type from among the J possible junction types, and for at least one wall type a from among the N1 possible layered wall types, and for at least one wall type b from among the N2 possible layered wall types, a digital representation of a physical member e.g. stud or (typically rectangular) prism or sleeve, and wherein at least one wall of type a and/or at least one wall of type b interlock indirectly via the physical member.

Embodiment 5. A method according to any of the preceding embodiments wherein the at least one wall of type a and/or at least one wall of type b interlock directly with one another, rather than interlocking only indirectly via the physical member.

N1 may or may not equal N2, type a may or may not be equal to type b, and more generally, various parameters herein may or may not be equal to one another.

Embodiment 6. A method according to any of the preceding embodiments wherein the digital representations of each of the plural portions of the plural walls are each part of a digital representation of each of the plural walls in their respective entireties.

According to any embodiment, the system stores digital representations of each of the M supported wall types, crossed with each of the J supported junction types such that, typically, the system stores J_2 digital representations of each of the M wall types, where each end-portion of the wall may be detailed according to one of the J supported junction types.

Typically, each such digital representation may comprise (or from which may be derived) a production file or a set of production instructions, which may be used by a wall manufacturing facility to manufacture one of the M supported wall types crossed with one (or 2 or more, depending on how many junctions the wall "participates" in) of the J supported junction types. Typically, each such digital representation includes an indication of which layers the wall includes and/or in which order, and/or thickness of each layer and/or materials from which the layers are to be manufactured, and/or dimensions of the wall. For example, if 6 wall types and 6 junction types are supported, and all junctions involve only end-portions of walls (e.g. no t-junction and no single-wall junction), the system may include a digital repository of 216 digital representations, each of which suffices to manufacture, typically using a digitally controlled manufacturing facility, a wall which is configured to "participate" in certain given junctions.

Another method may be to store digital representations of each of m walls, then modify each wall's first end by concatenating to the wall's first endpoint (or replacing the wall's first end-portion with) a wall-end of some type, corresponding to one type of junction, and/or modify each wall's second end by concatenating to the wall's second endpoint (or replacing the wall's second end-portion with) a wall-end of some other type, corresponding to some other type of junction. A non-end portion of a wall (e.g. for a t-junction) may be modified e.g. by replacing a non-end portion of the wall (of one of the 6 wall types) with a wall-portion, corresponding to a certain type of junction such as a t-junction.

Embodiment 7. A method according to any of the preceding embodiments wherein the repository of wall portion digital representations includes a digital representation of a first wall portion and a digital representation of a second wall portion which is at least partly defined analytically as a function of the digital representation of the first wall portion.

Embodiment 8. A method according to any of the preceding embodiments wherein the repository of wall portion digital representations includes a digital representation of a first wall portion and a digital representation of a second wall portion which differs only parametrically from the digital representation of the first wall portion.

Embodiment 9. A method according to any of the preceding embodiments wherein the digitally positioning includes positioning walls intended to interlock with one another at a distance one from another rather than engaging one another, and wherein the identifying at least one portion of the building geometry as an individual junction includes identifying plural walls at a distance one from another as walls which, if extended toward one another, yield a junction belonging to one of the M possible junction types.

Embodiment 10. A method according to any of the preceding embodiments wherein at least one of the layered wall types includes a sequence of at least one of the following types of layers: a thermal insulation layer, a structural layer, an acoustic layer, a light gauge steel (aka LGS) layer, a fire-rating or fireproof layer, a waterproof layer, and a finish layer such as a high performance acrylic coating layer.

Embodiment 11. A method according to any of the preceding embodiments wherein the plural portions are configured to interlock with one another such that the building geometry is constructed, once the M walls have been manufactured, by interlocking at least the plural portions.

Embodiment 12. A method according to any of the preceding embodiments wherein the classifying comprises identifying the at least one portion of the building geometry, which includes at least portions of each of at least one e.g. plural walls respectively, as an individual junction aka engagement location between the plural walls, and then classifying the individual junction as belonging to one of J possible junction types.

Embodiment 13. A method for designing buildings, the method comprising:
a. providing a user interface which may enable an end-user to define at least one object/s and to assign at least one value/s to at least one property/ies, of the at least one object/s respectively; and/or b. providing a hardware processor which interacts with the user interface and which may be configured to, typically, temporarily, change at least an individual value, assigned by the end-user, to an individual property from among the at least one property/ies, of the object, to a new typically temporary value, to make at least one determination using the new temporary value, and to restore the individual property's value, typically to the individual value assigned by the end-user.

Embodiment 14. A method according to any of the preceding embodiments wherein the at least one object/s comprises at least a pair of walls including at least first and second walls, and wherein the individual value comprises a wall dimension, and wherein the determination comprises a determination of which of the first and second walls is a penetrating wall, and which is a master wall.

It is appreciated that the wall dimension may for example be the wall's width, and the new temporary value may for example be a narrower width than the width (individual value) assigned by the end-user.

And/or, the wall dimension may for example be the wall's length, and the new temporary value may for example be a longer length than the length (individual value) assigned by the end-user.

Embodiment 15. A method according to any of the preceding embodiments and wherein the determination uses the new temporary value by identifying which one of the first and second walls, whose properties have a new temporary value, has a short edge which intersects with a long edge of which other one of the first and second walls, and, responsively, determining that the one of the walls whose short edge intersects is a penetrating wall, whereas the other one of the walls, whose long edge intersects the short edge, is a master wall.

Embodiment 16. A method according to any of the preceding embodiments wherein the at least one object/s comprises a shaft and wherein the individual value comprises at least one cross-sectional dimension of the shaft, and wherein the determination comprises a determination of which walls constitute the shaft's walls.

The shaft may for example comprise a pier.

Embodiment 17. A method according to any of the preceding embodiments and wherein the new temporary value comprises at least one new cross-sectional dimension which is larger than at least one cross-sectional dimension defined by the end-user, and wherein the determination uses the new temporary value by identifying which subset of plural walls defined by the end-user are located inside the shaft when the shaft's properties include the new cross-sectional dimension, and, responsively, determining that the subset constitutes the shaft's walls.

Embodiment 18. A method according to any of the preceding embodiments and also comprising:
a. providing a user interface enabling an end-user to define at least one object/s and to assign at least one value/s to at least one property/ies, of the at least one object/s respectively; and
b. providing a hardware processor which interacts with the user interface and which is configured to temporarily change at least an individual value, assigned by the end-user to an individual property from among the at least one property/ies, of the object, to a new temporary value, to make at least one determination using the new temporary value, and to restore the individual property's value, to the individual value assigned by the end-user.

Embodiment 19. A method for identifying a corner, the method including:
Receiving a digital representation of walls typically having ends, typically including the walls' relative positioning; and/or
Using a hardware processor to extend outward, along at least one dimension, at least one of the ends of at least one of the walls, thereby to define at least one virtual cap at location L for at least an end A of a wall X, and identifying a corner at location L if the virtual cap touches or penetrates a wall Y other than wall X.

thereby to facilitate efficient generation of digital walls such as layered walls by allowing human end-users to efficiently provide digital representations of walls including their relative positioning but not including detailing of corners where the walls intersect.

Embodiment 20. A method according to any of the preceding embodiments wherein a corner is identified at location L if the virtual cap touches or penetrates a virtual cap defined for wall Y.

Embodiment 21. A method according to any of the preceding embodiments wherein the corner is classified as belonging to one of plural corner types, depending on at least one of: wall X's orientation, wall Y's orientation, whether or not there is overlap between wall X's virtual cap and wall Y, whether or not there is overlap between wall X's virtual cap and wall Y's virtual cap, degree and/or direction of overlap between wall X's virtual cap and wall Y's virtual cap, degree and/or direction of overlap between wall X's virtual cap and wall Y if any . . . .

Also provided is a computer program product, comprising a non-transitory tangible computer readable medium having computer readable program code embodied therein, the computer readable program code adapted to be executed to implement any method shown or described herein.

Also provided is a system comprising at least one hardware processor configured to carry out the operations of any method shown or described herein.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes, or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means include computer programs, in accordance with all or any subset of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying, machine-readable memory such as flash drives, optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules illustrated and described herein may include any one or combination or plurality of: a server, a data processor, a memory/computer storage, a communication interface (wireless (e.g. BLE) or wired (e.g. USB)), or a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in singular form is not intended to be limiting; thus the term processor is intended to include a plurality of processing units which may be distributed or remote, the term server is intended to include plural typically interconnected modules running on plural respective servers, and so forth.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements all or any subset of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices, or may be provided to external factors e.g. via a suitable data network. The term "computer" should be broadly construed to cover any kind of electronic device with data processing capabilities, including, by way of non-limiting example, personal computers, servers, embedded cores, computing system, communication devices, processors (e.g. digital signal processors (DSPs), microcontrollers, field programmable gate arrays (FPGAs), application specific integrated circuits (ASICs), etc.) and other electronic computing devices. Any reference to a computer, controller or processor is intended to include one or more hardware devices e.g. chips, which may be co-located or remote from one another. Any controller or processor may, for example, comprise at least one CPU, DSP, FPGA or ASIC, suitably configured in accordance with the logic and functionalities described herein.

Any feature or logic or functionality described herein may be implemented by processor/s or controller/s configured as per the described feature or logic or functionality, even if the processor/s or controller/s are not specifically illustrated for simplicity. The controller or processor may be implemented in hardware, e.g., using one or more Application-Specific Integrated Circuits (ASICs) or Field-Programmable Gate Arrays (FPGAs), or may comprise a microprocessor that runs suitable software, or a combination of hardware and software elements.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components and, alternatively, may be the same structure. A statement that an element or feature may exist is intended to include (a) embodiments in which the element or feature exists; (b) embodiments in which the element or feature does not exist; and (c) embodiments in which the element or feature exist selectably, e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate or route, or otherwise manipulate or process information as described herein and/or to perform functionalities described herein and/or to implement any engine, interface or other system illustrated or described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

The system shown and described herein may include user interface/s e.g. as described herein which may for example include all or any subset of: an interactive voice response interface, automated response tool, speech-to-text transcription system, automated digital or electronic interface having interactive visual components, web portal, visual interface loaded as web page/s or screen/s from server/s via communication network/s to a web browser or other application downloaded onto a user's device, automated speech-to-text conversion tool, including a front-end interface portion thereof and back-end logic interacting therewith. Thus the term user interface or "UI" as used herein includes also the underlying logic which controls the data presented to the user e.g. by the system display and receives and processes and/or provides to other modules herein, data entered by a user e.g. using her or his workstation/device.

BRIEF DESCRIPTION OF THE DRAWINGS

Example embodiments are illustrated in the various figures. Certain embodiments of the present invention are illustrated in the following figures; in the block diagrams, arrows between modules may be implemented as APIs, and any suitable technology may be used for interconnecting functional components or modules illustrated herein in a suitable sequence or order e.g. via a suitable API/interface. For example, state of the art tools may be employed, such as but not limited to Apache Thrift and Avro which provide remote call support. Or, a standard communication protocol may be employed, such as but not limited to HTTP or MQTT, and may be combined with a standard data format, such as but not limited to JSON or XML.

Methods and systems included in the scope of the present invention may include any subset or all of the functional blocks shown in the specifically illustrated implementations by way of example, in any suitable order e.g. as shown. Flows may include all or any subset of the illustrated operations, suitably ordered e.g. as shown. tables herein may include all or any subset of the fields and/or records and/or cells and/or rows and/or columns described. Specifically.

This example shows a final result in which separate walls create an aligned detailed connection, using a detailing automation tool according to any embodiment herein.

Figure 2:
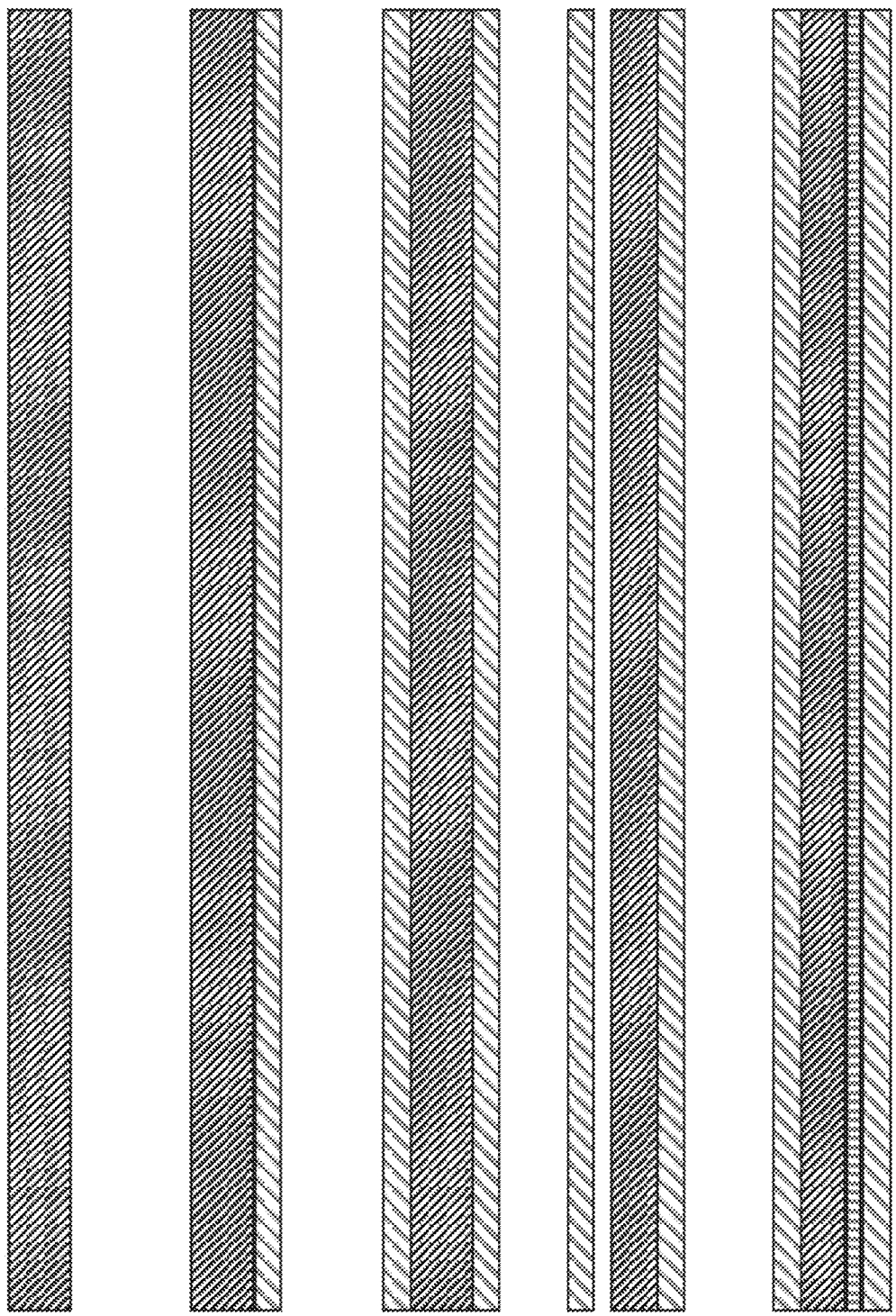

FIG. 2 illustrates a wall type family by way of example. Each project may have a CAD wall family with predetermined properties. The figure shows a family comprised of five walls that can be used to model a building and then be detailed by the tool.

Figure 3:
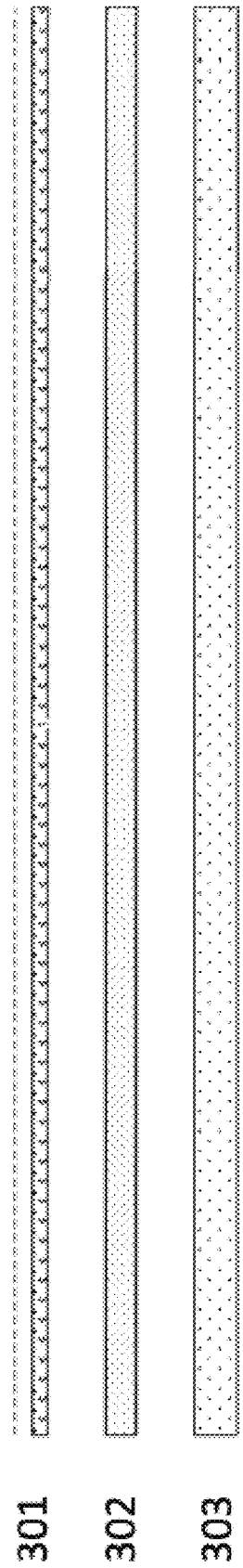

FIG. 3 illustrates a wall-finish family example. Each project may have a CAD wall-finish family. The illustration shows an example of a family comprised of three different finish types. There is typically a difference between interior and exterior finishes.

Figure 4:
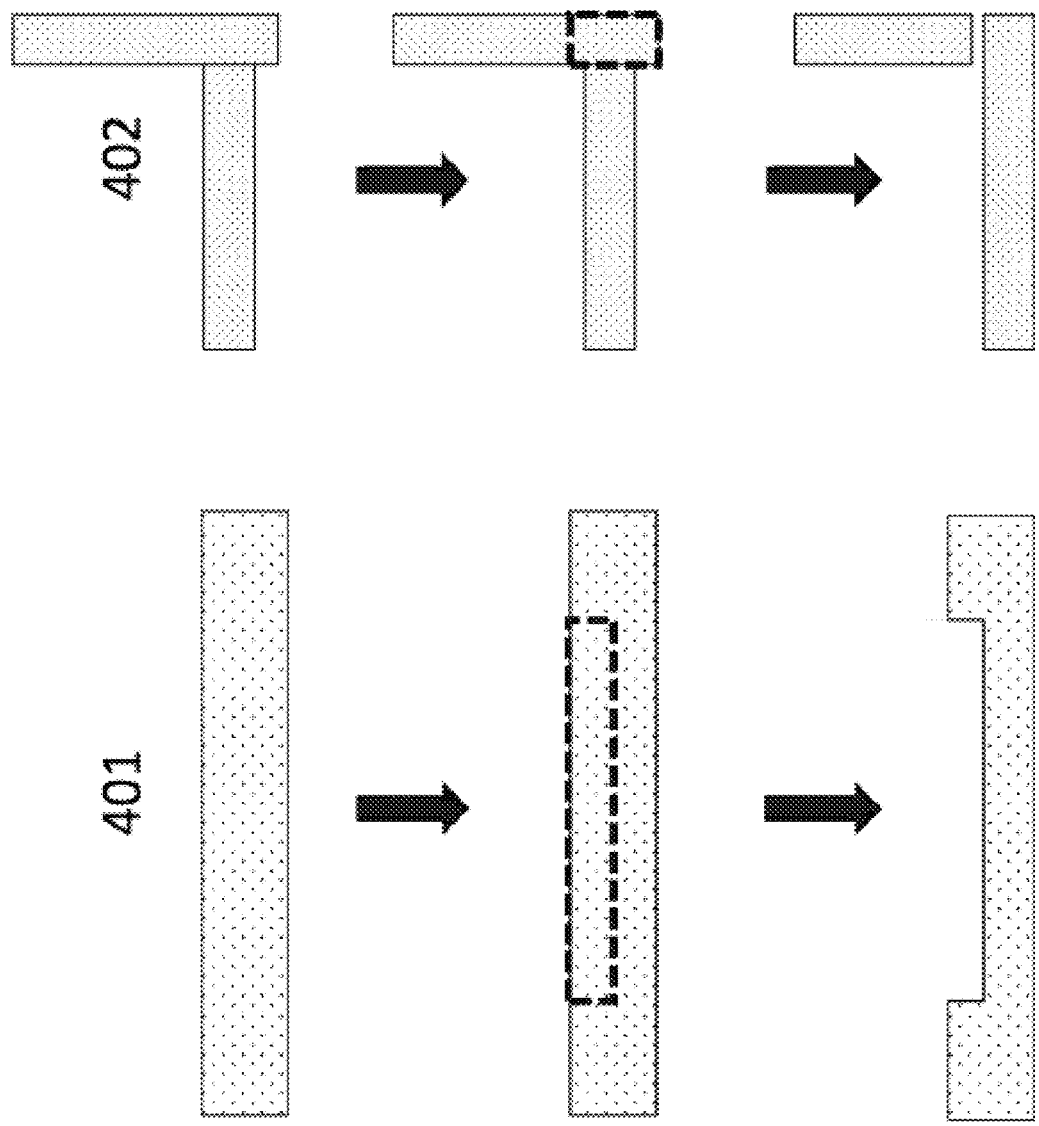

FIG. 4 illustrates a penetration family by way of example. This family is comprised of objects that create holes in finish layers. On the left, a penetration for a penetrating wall connection is illustrated. On the right, a penetration to detail finishes at a corner is illustrated.

Figure 5:
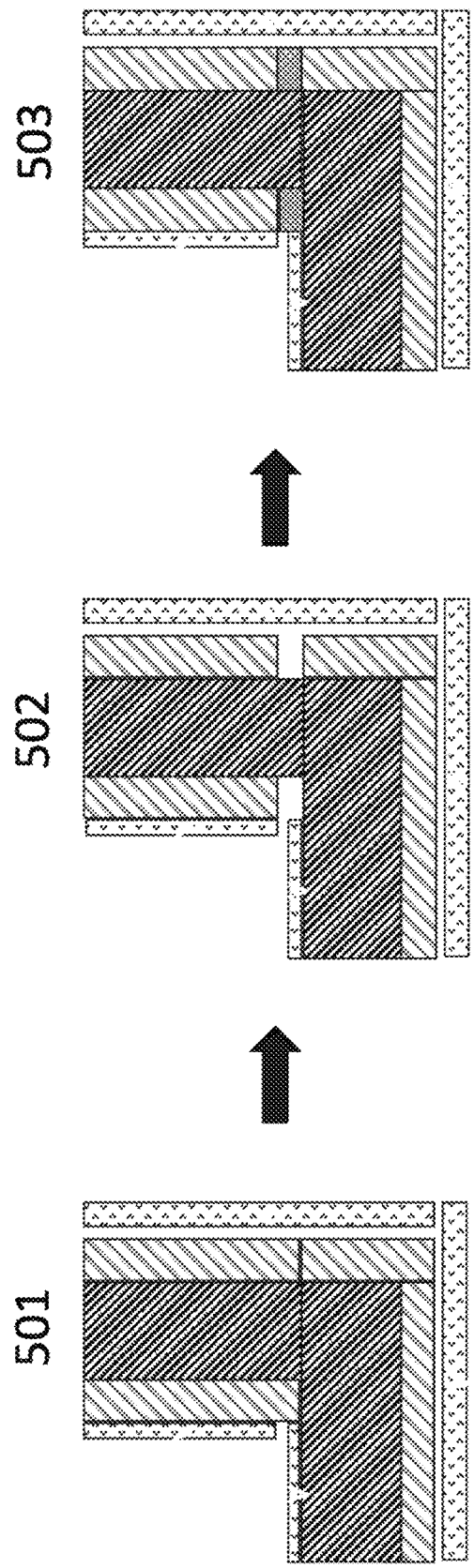

FIG. 5 illustrates a void family by way of example. A void family may include objects that remove matter at wall connections and replace the removed matter by a material with a specific desired function, such as fire or sound proofing. A void family may include a sleeve or stud or other structural element which secures plural walls to one another, thereby typically forming corners.

Figure 6:
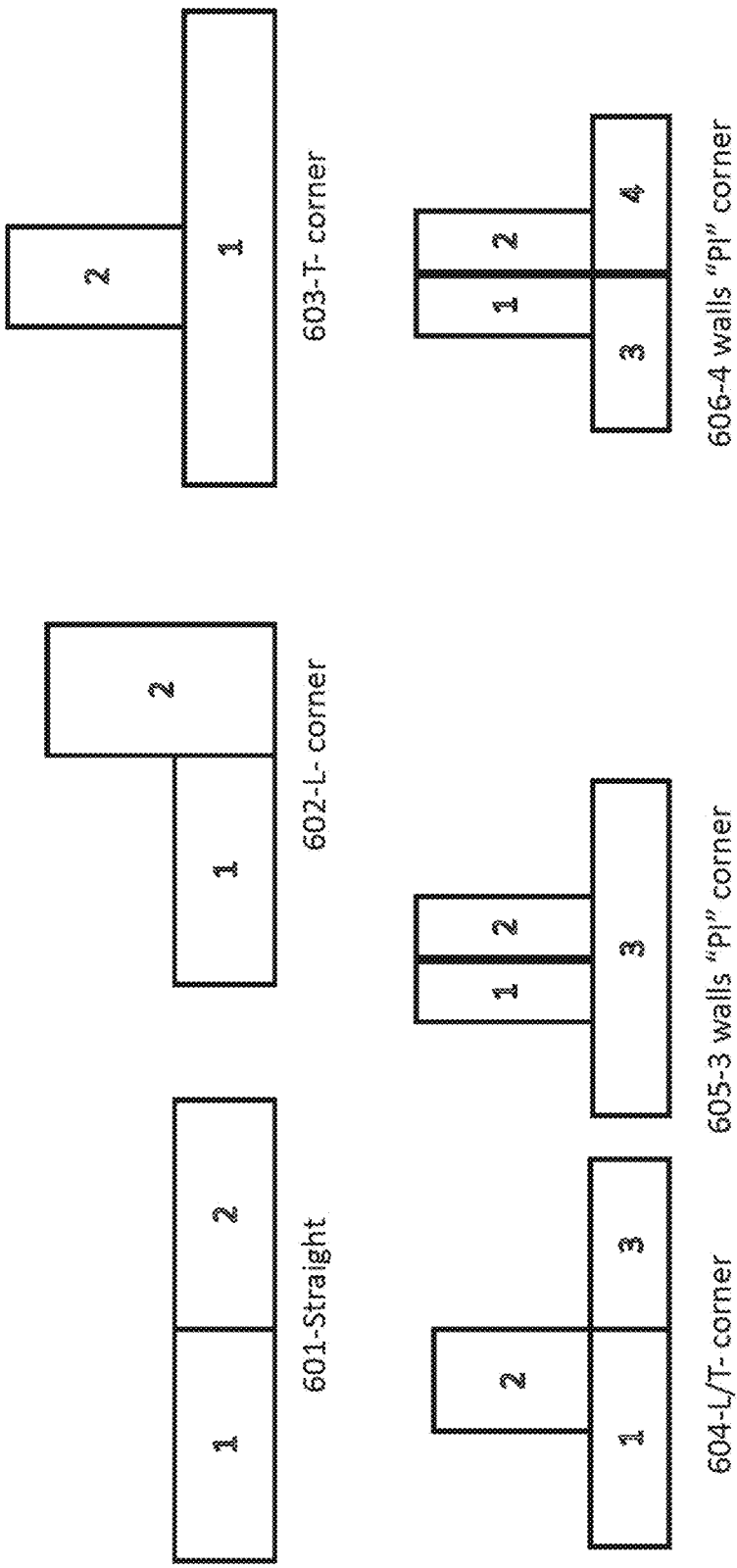

FIG. 6 illustrates walls connection types by way of example. Each project may have a finite number of wall connection type. Each type may require different detailing.

FIG. 7 illustrates an example of a corner before and after a detailing process.

The detailing is comprised of many actions. Some are visible and some are not.

Figure 8:
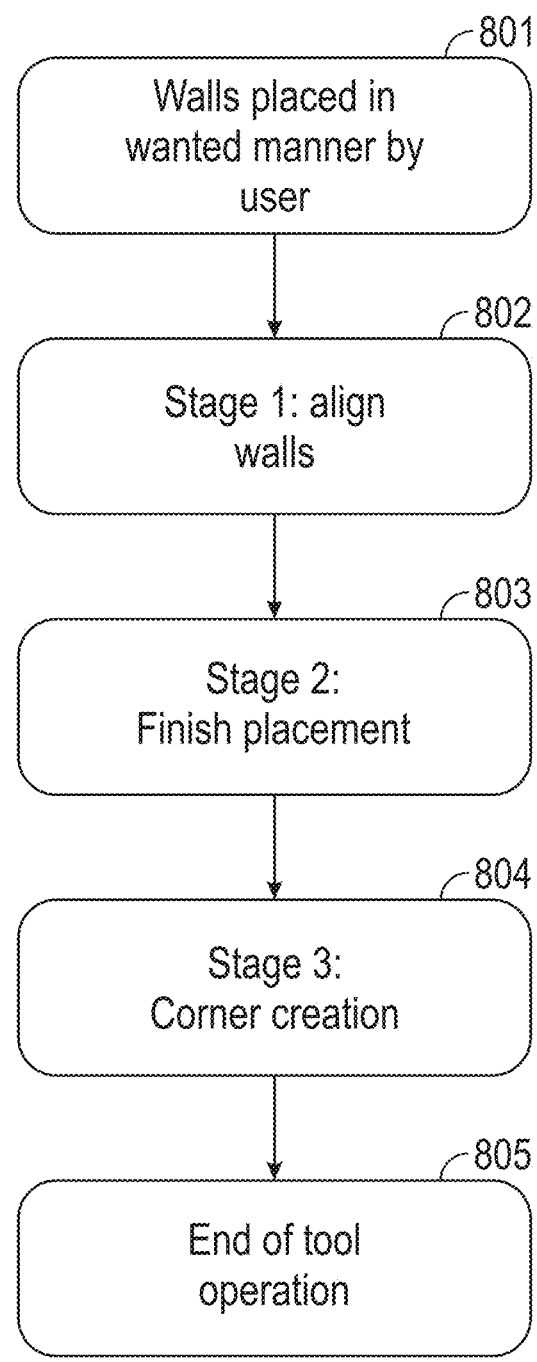

FIG. 8 illustrates an example of a wall detailing process according to certain embodiments; all or any subset of illustrated operations may be provided. The number different stages may change and/or may be subdivided into parts.

FIG. 9 illustrates an example of an "L-corner" before and after the automation tool process. A corner is "found", "identified", and the walls are aligned.

Figure 10:
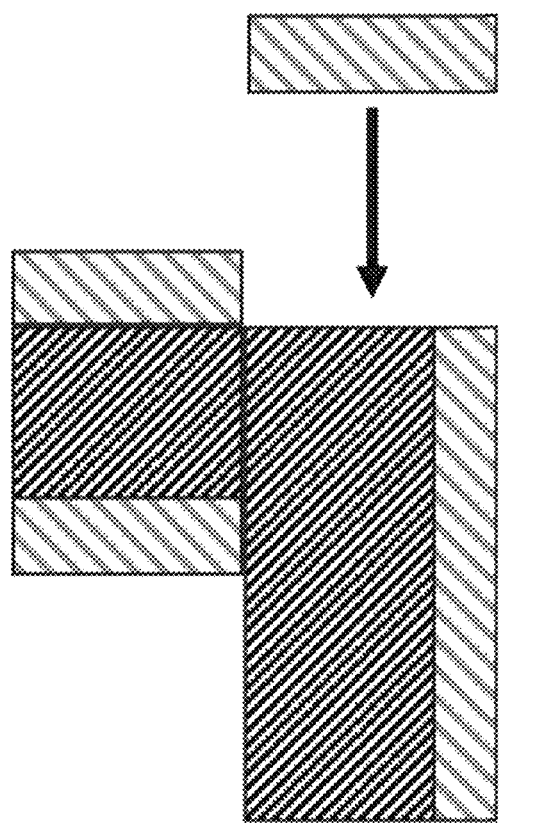

FIG. 10 illustrates addition of a cap on the master wall of an L-corner by way of example. This type of detailing may be specific for that corner type and can be done as a part of stage 1; any suitable method such as the method of FIG. 15 may be employed to determine which wall in an L-corner is a master wall.

Figure 11:
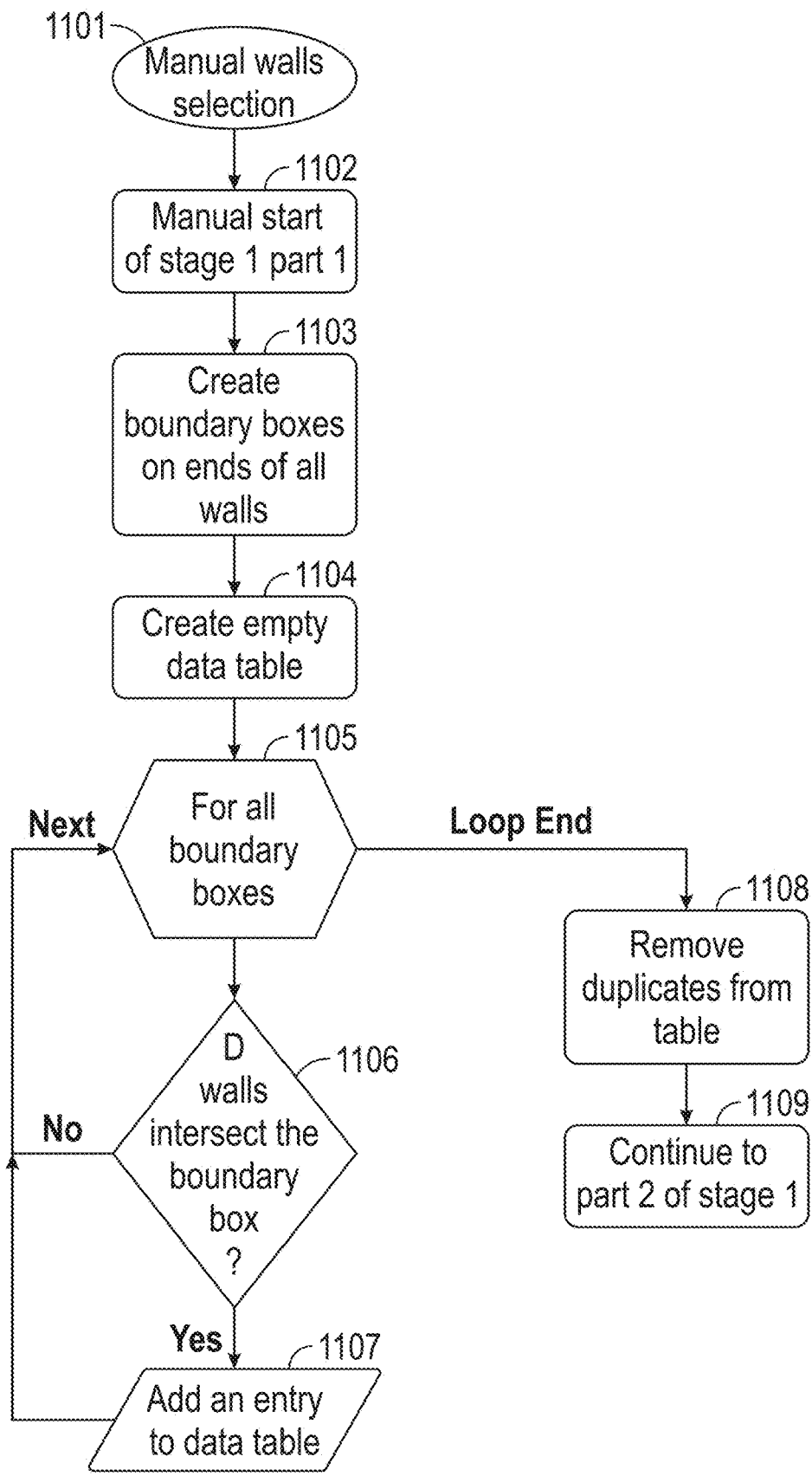

FIG. 11 is a simplified flowchart illustration of a method for performing stage 1 part 1 in which corners are identified and registered (stored in a table or other data structure).

Figure 12:
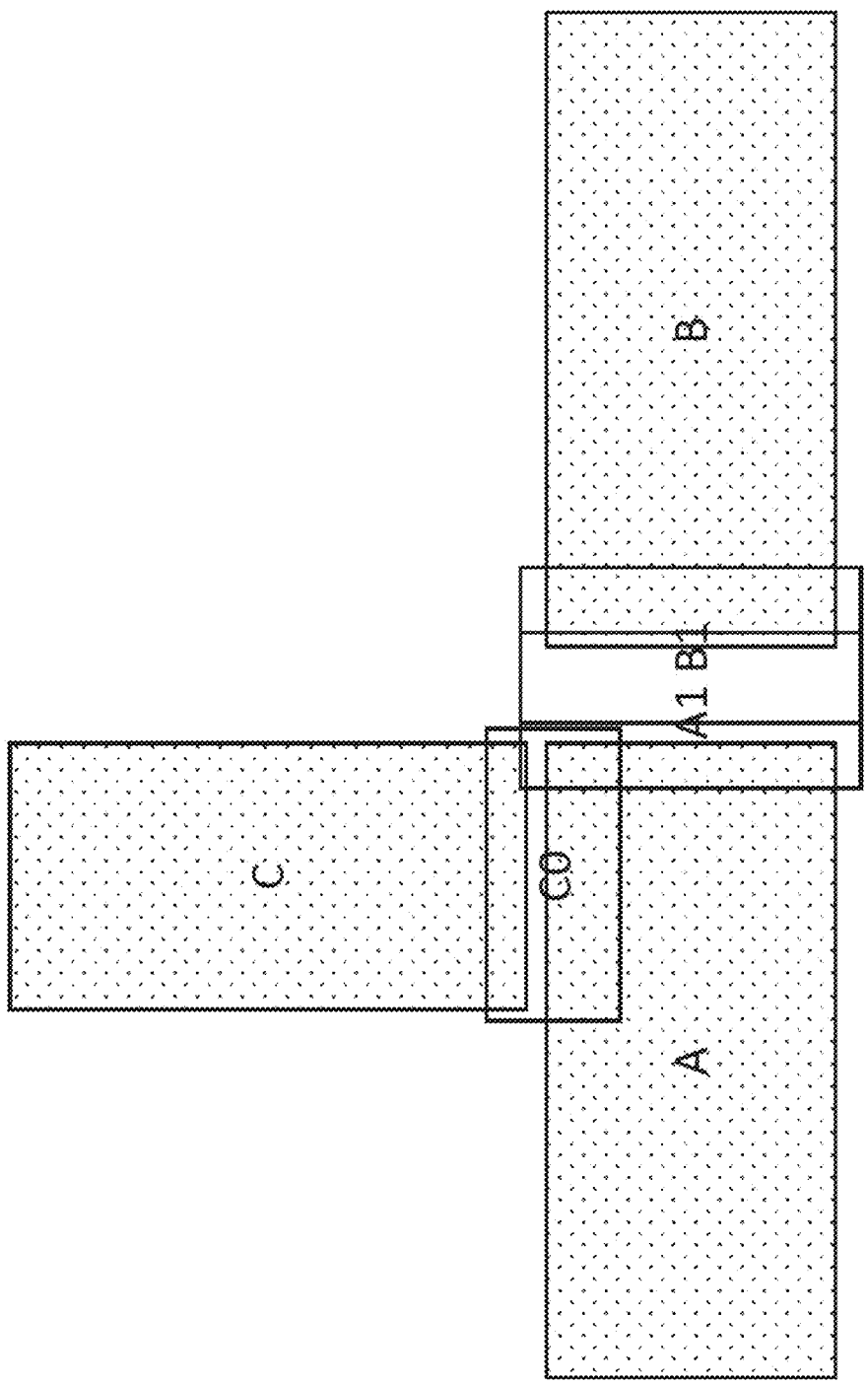

FIG. 12 illustrates an example of an "L-T" corner with bounding boxes on the walls' ends. Typically, each bounding box belongs to a wall end and is numbered 0 or 1.

Figure 13:
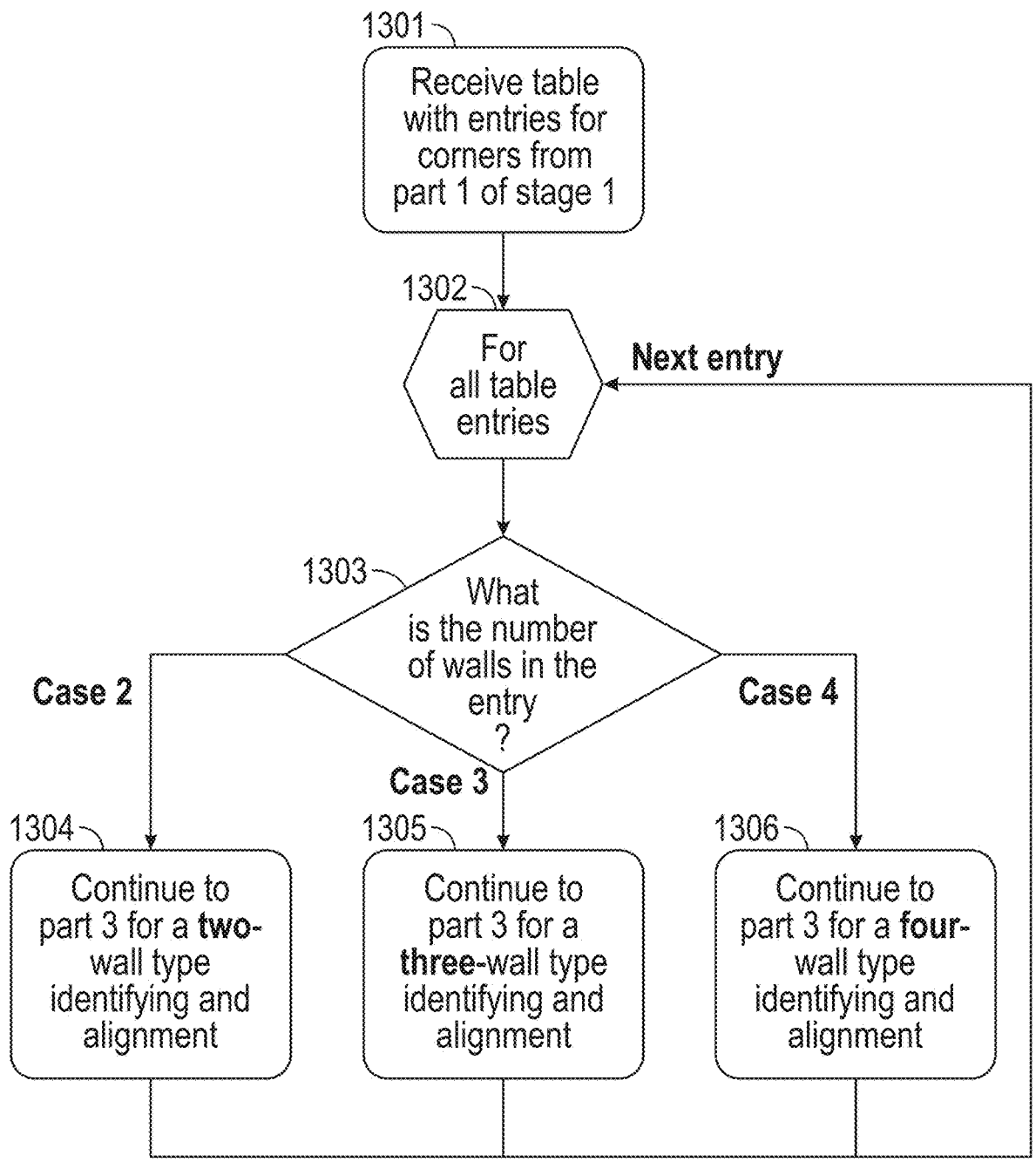

FIG. 13 is a simplified flowchart illustration of a method for performing part 2 of stage 1: determination of the number of walls in a corner. This step is preliminary to the corner type identification.

Figure 14:
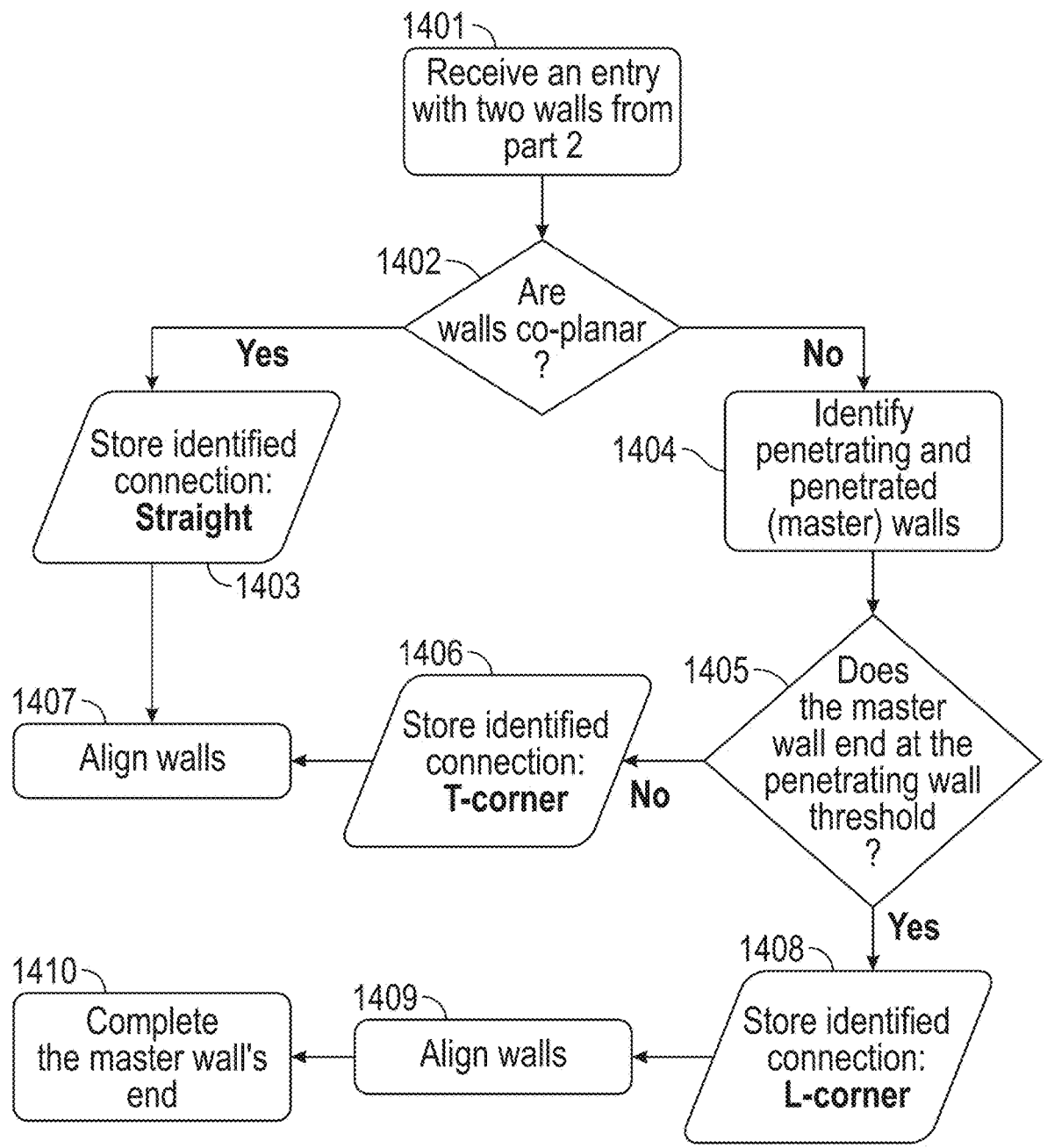

FIG. 14 is a simplified flowchart illustration of a method for performing two-walls connection type identification and alignment. This is done after the wall number in the corner has been identified to be two.

Figure 15:
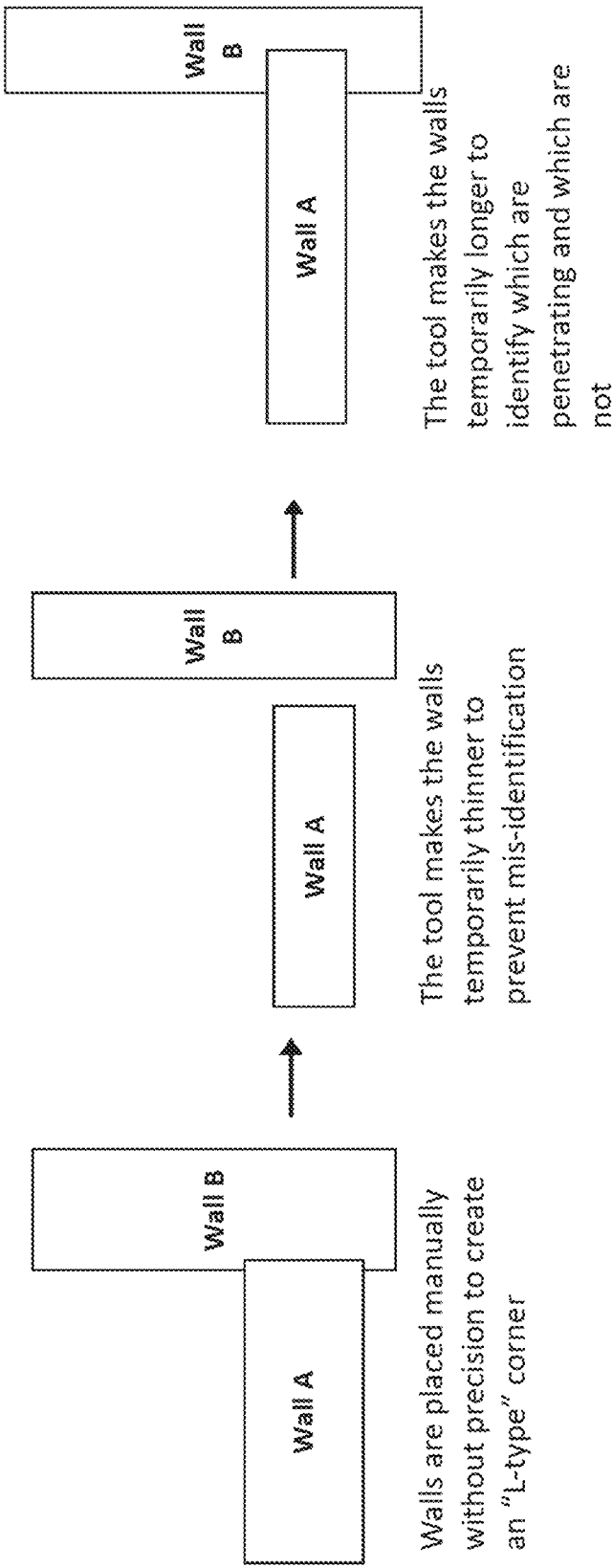

FIG. 15 illustrates a process of identifying a penetration wall and a master wall.

The walls are temporarily thinned and elongated respectively to prevent misidentification and to detect penetrations.

Figure 16:
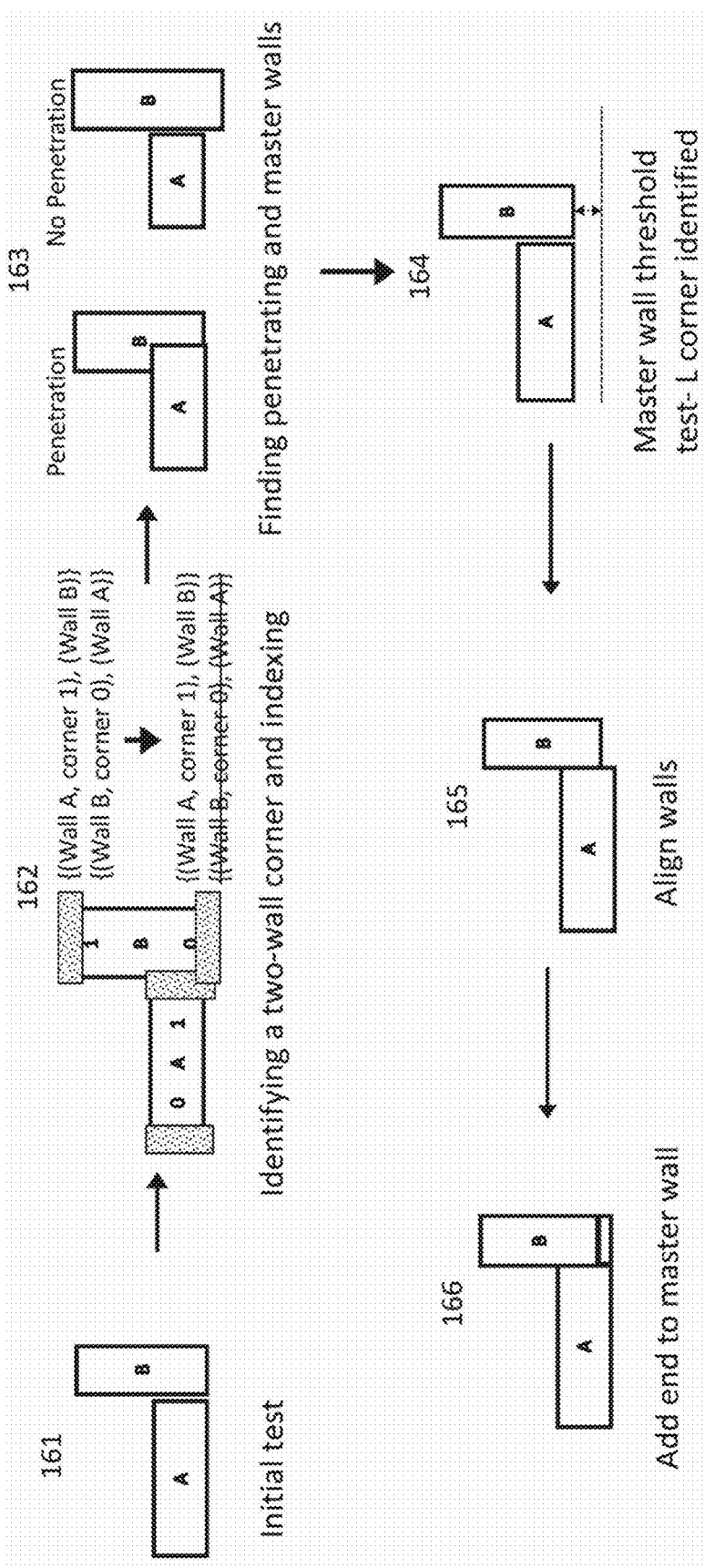

FIG. 16 illustrates a simplified flowchart illustration for a two-walls "L" corner alignment stage including all the different actions.

Figure 17:
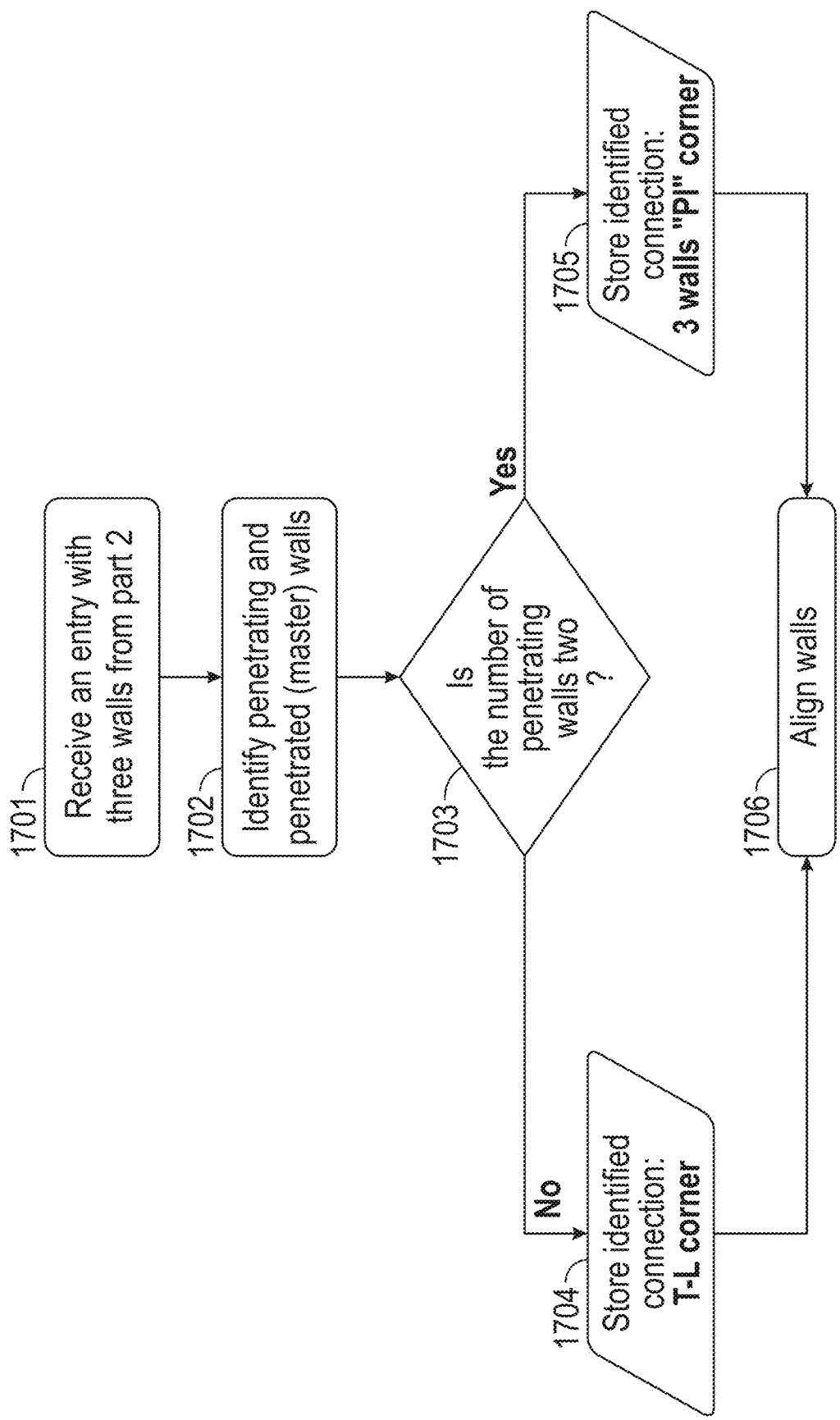

FIG. 17 is a simplified flowchart illustration of a method for performing stage 1 part 3: a three-walls connection type identification and alignment after the number of walls as been identified to be three.

Figure 18:
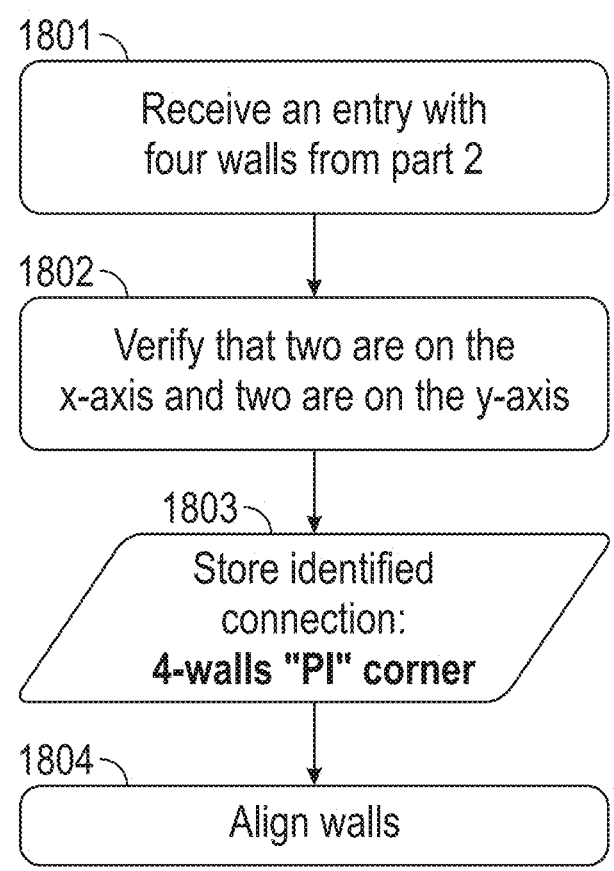

FIG. 18 is a simplified flowchart illustration of a method for performing stage 1 part 3: a four-walls connection type alignment after the number of walls has been identified to be four.

FIG. 19 illustrates an example of an "L-corner" before the second stage of finish placement has been carried out, and pursuant to such. In this stage suitable finish layers are placed on both wall sides using data from the model.

Figure 20:
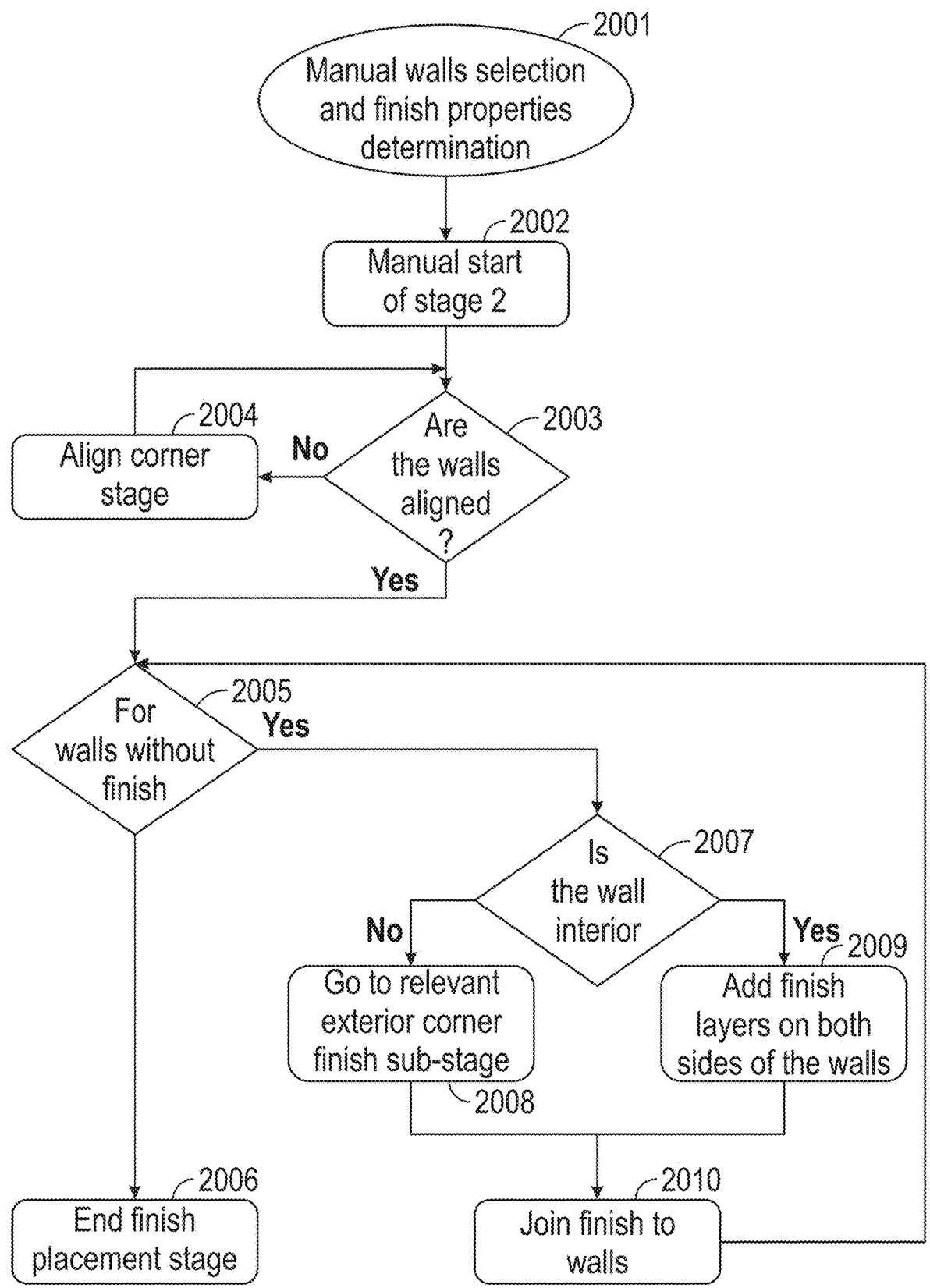

FIG. 20 is a simplified flowchart illustration of a stage 2 process for finish placement. The tool is able to identify the wall type and add suitable finish layers according to corner types and wall types (interior/exterior).

Figure 21:
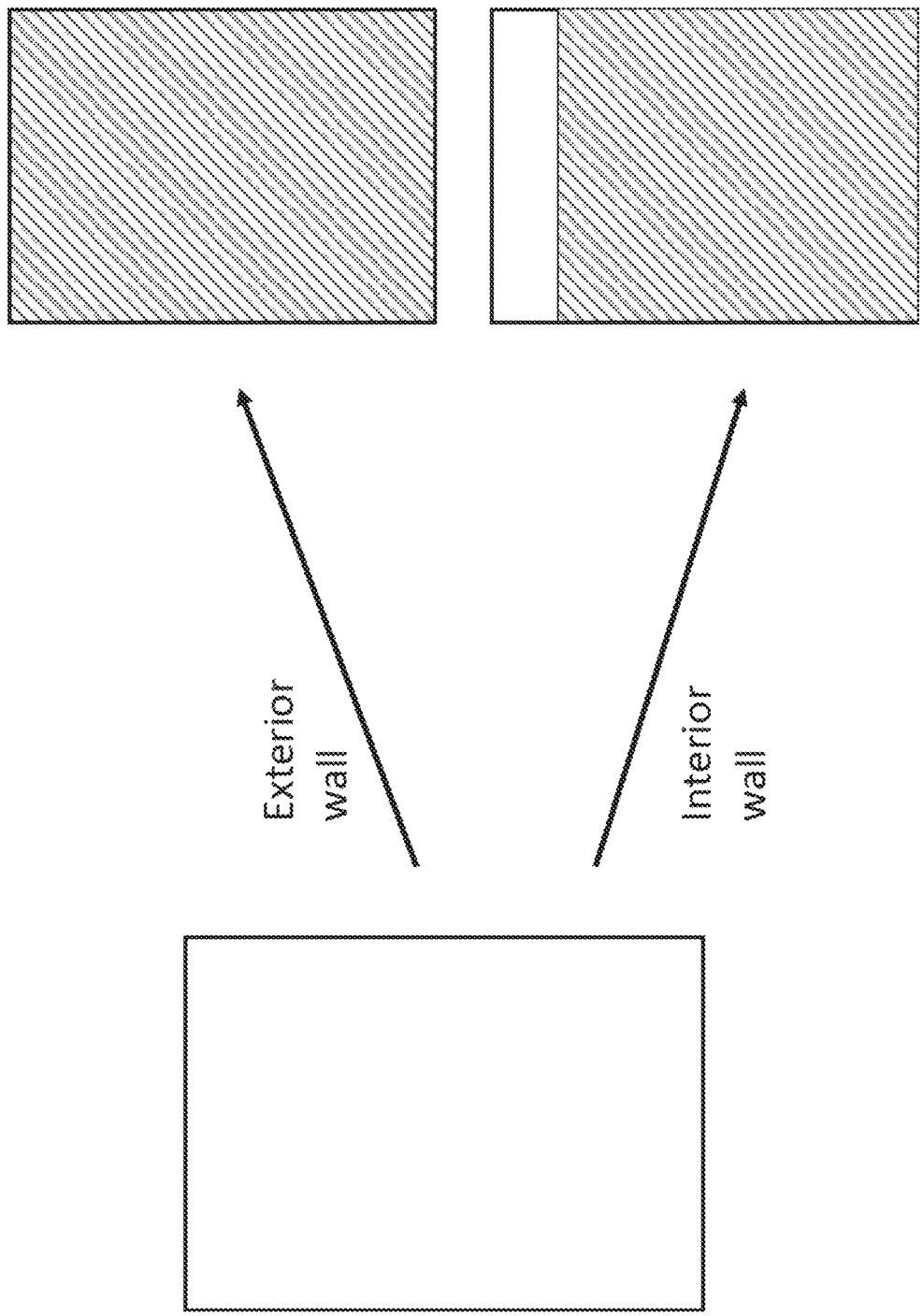

FIG. 21 illustrates wall finish height examples. As a default, the elevation of the interior or exterior finish can be set to different heights for different reasons. The finish layers do not necessarily go all the way up the wall.

Figure 22:
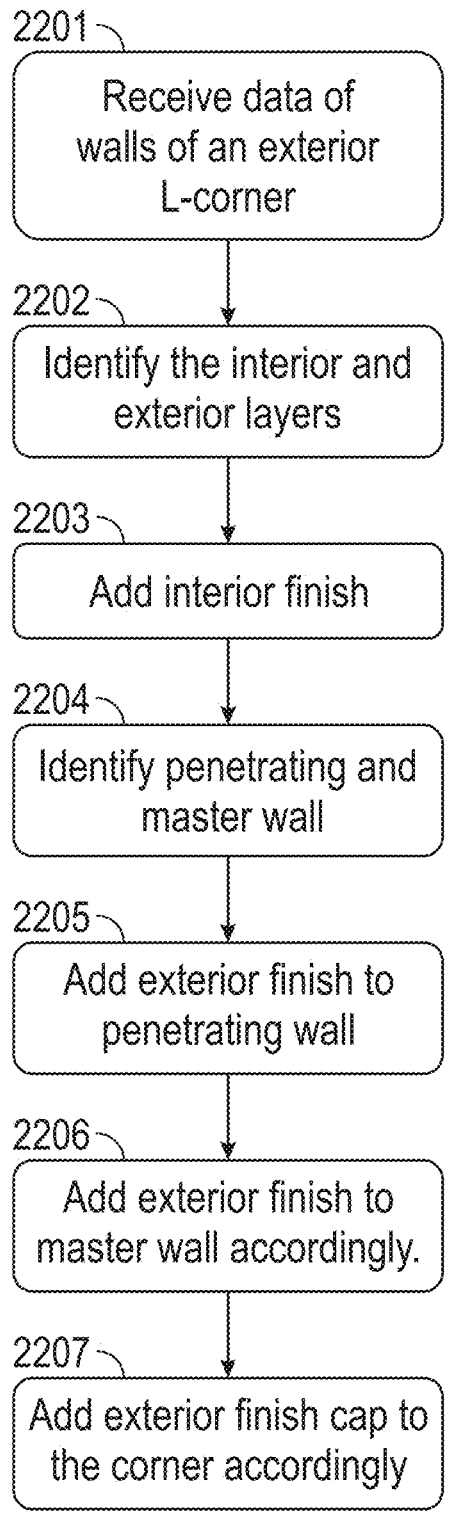

FIG. 22 illustrates a method for performing operation 2008 in which an "L-corner" of an exterior wall is subjected to specific detailing.

Figure 23:
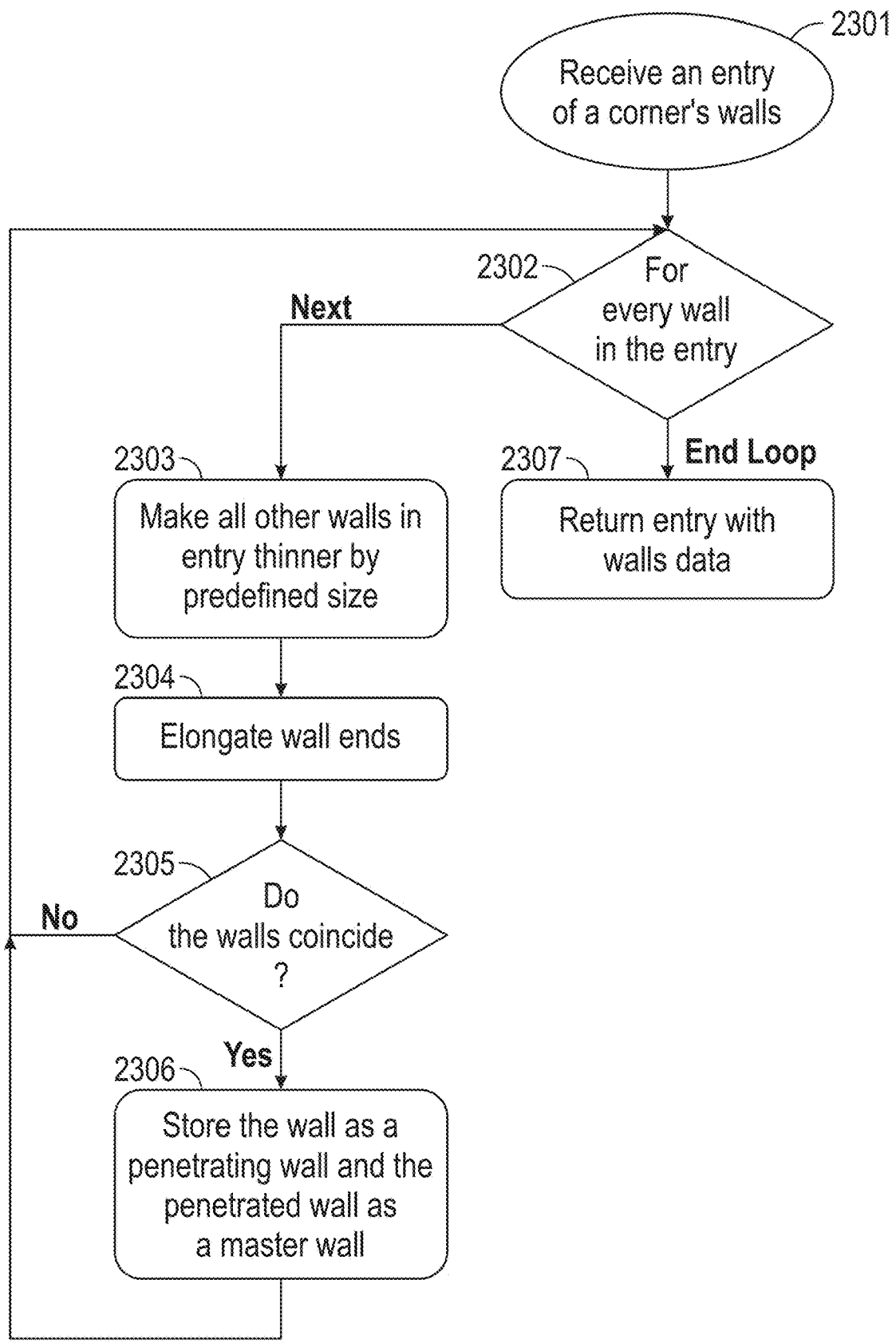

FIG. 23 is a simplified flow-chart illustration of a method by which the automation tool can identify penetrating walls and master walls.

Figure 24:
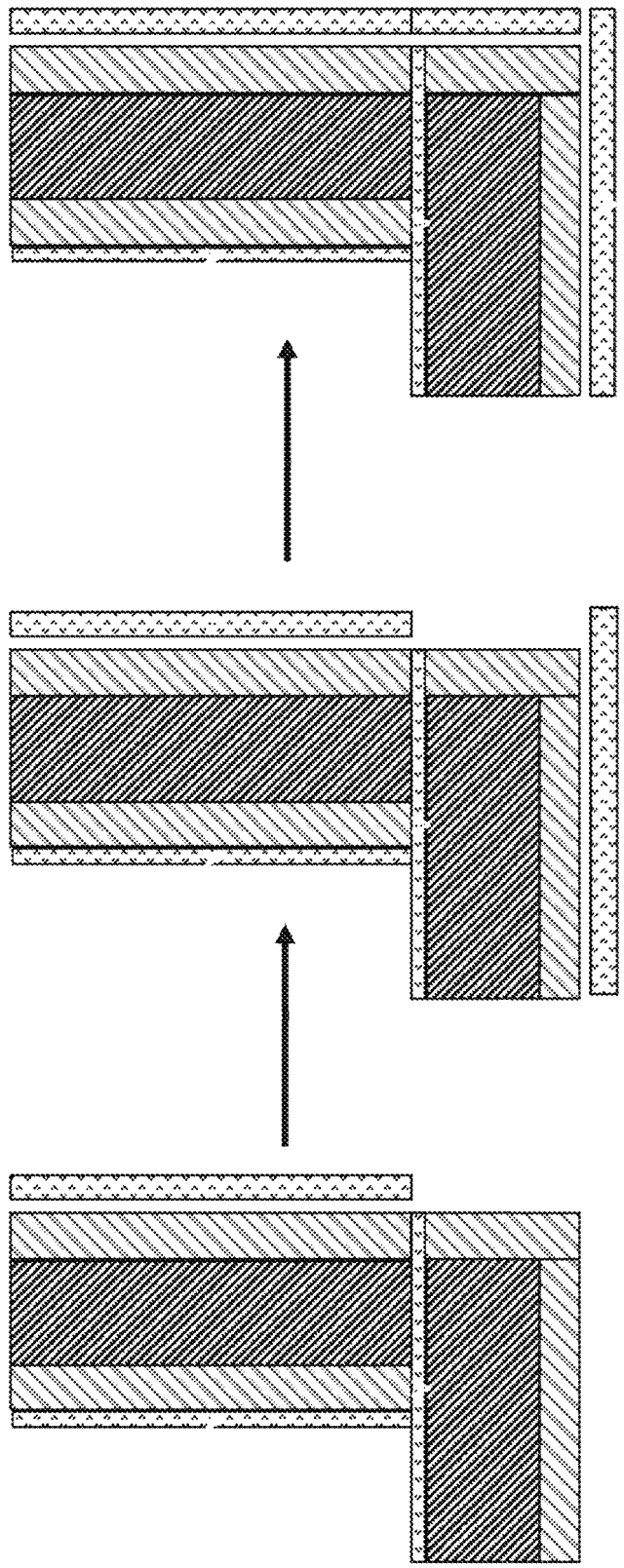

FIG. 24 illustrates an example of an "L-type" corner finish detailed in several steps in stage 2.

FIG. 25 illustrates an example of an "L-corner", before and after stage 3. "Penetration" and "void" families are added to the existing aligned, finished walls.

Figure 26A:
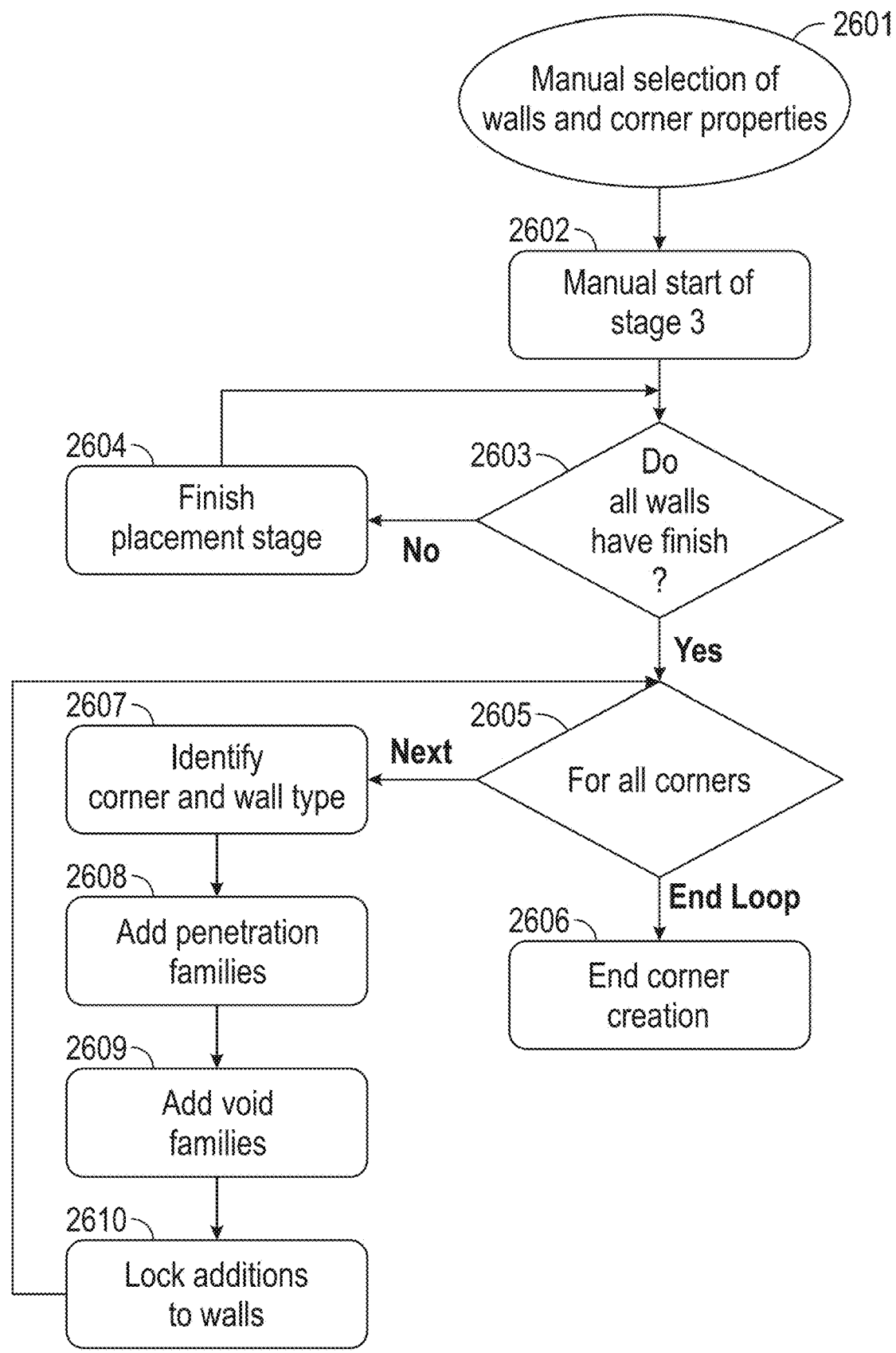

FIG. 26a is a simplified flow-chart illustration for a stage 3 corner creation method.

Figure 26B:
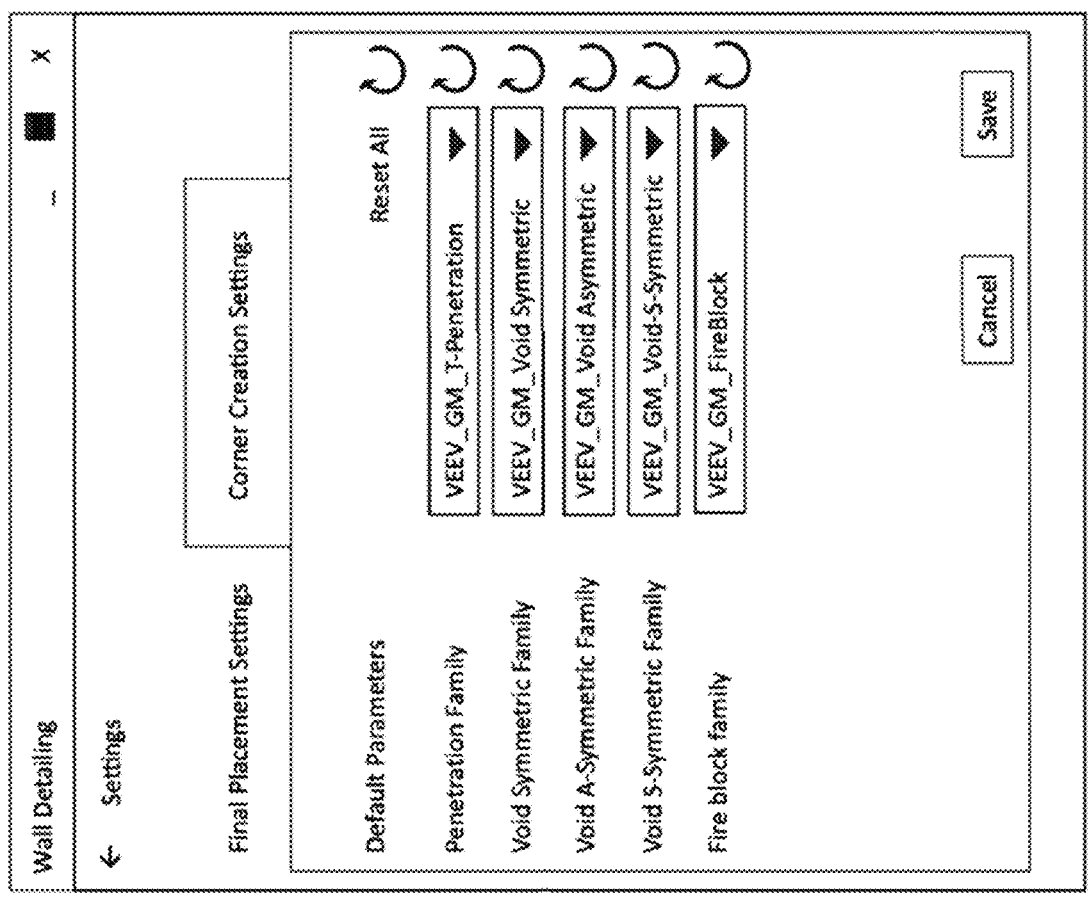

FIG. 26b illustrates an example user interface useful in accordance with certain embodiments; all or any subset of the illustrated elements may be provided.

FIG. 27 illustrates a front view of a wall in which a fire-block object has been placed. The tool identifies the object and stretches it vertically.

FIG. 28 illustrates an example of a printing pattern placed on a wall's finish layer. The finish can be stretched automatically by the tool vertically, horizontally, or through a route.

Figure 29:
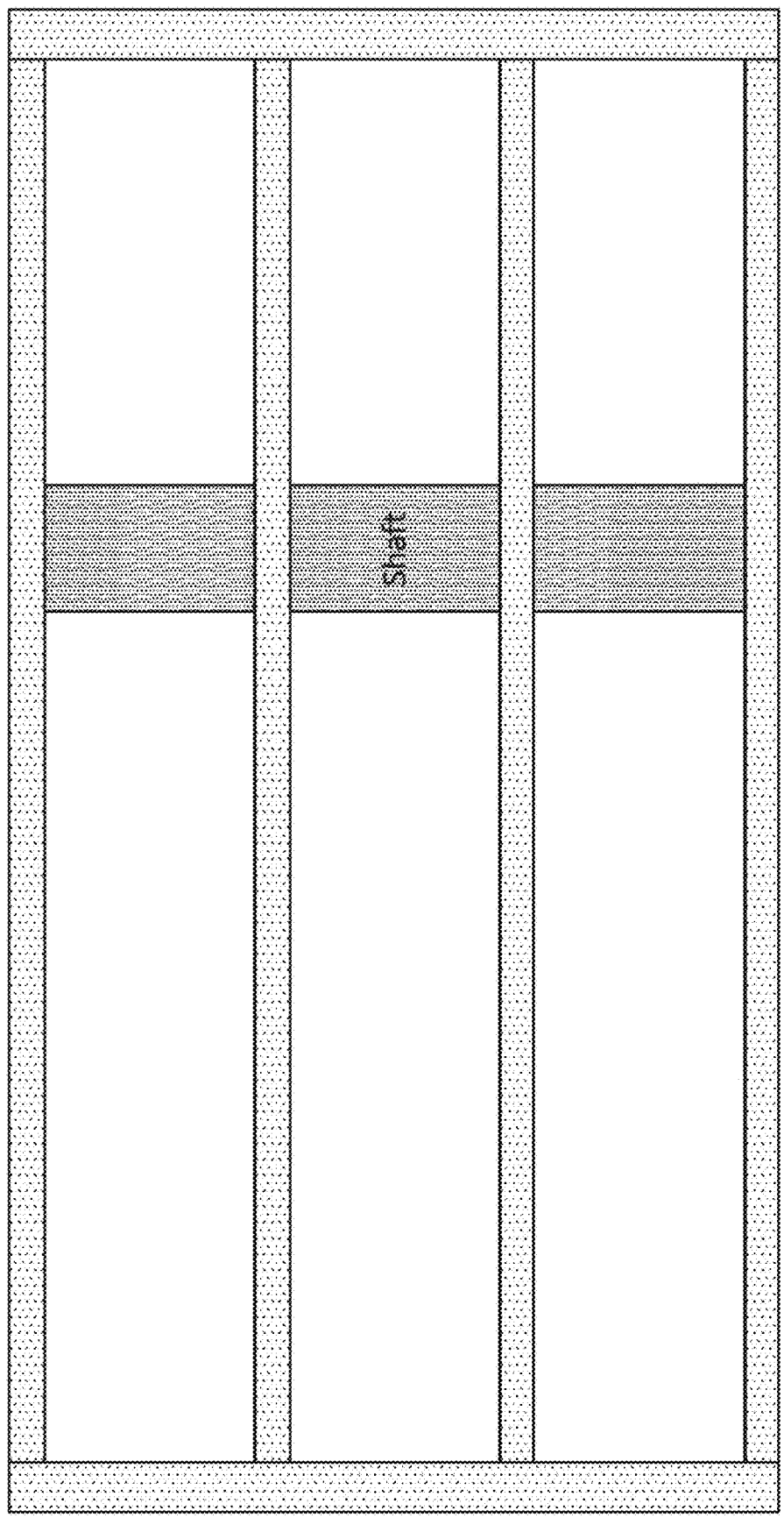

FIG. 29 illustrates a front-view sketch of a three-floor building with a shaft object that has been placed manually.

Figure 30:
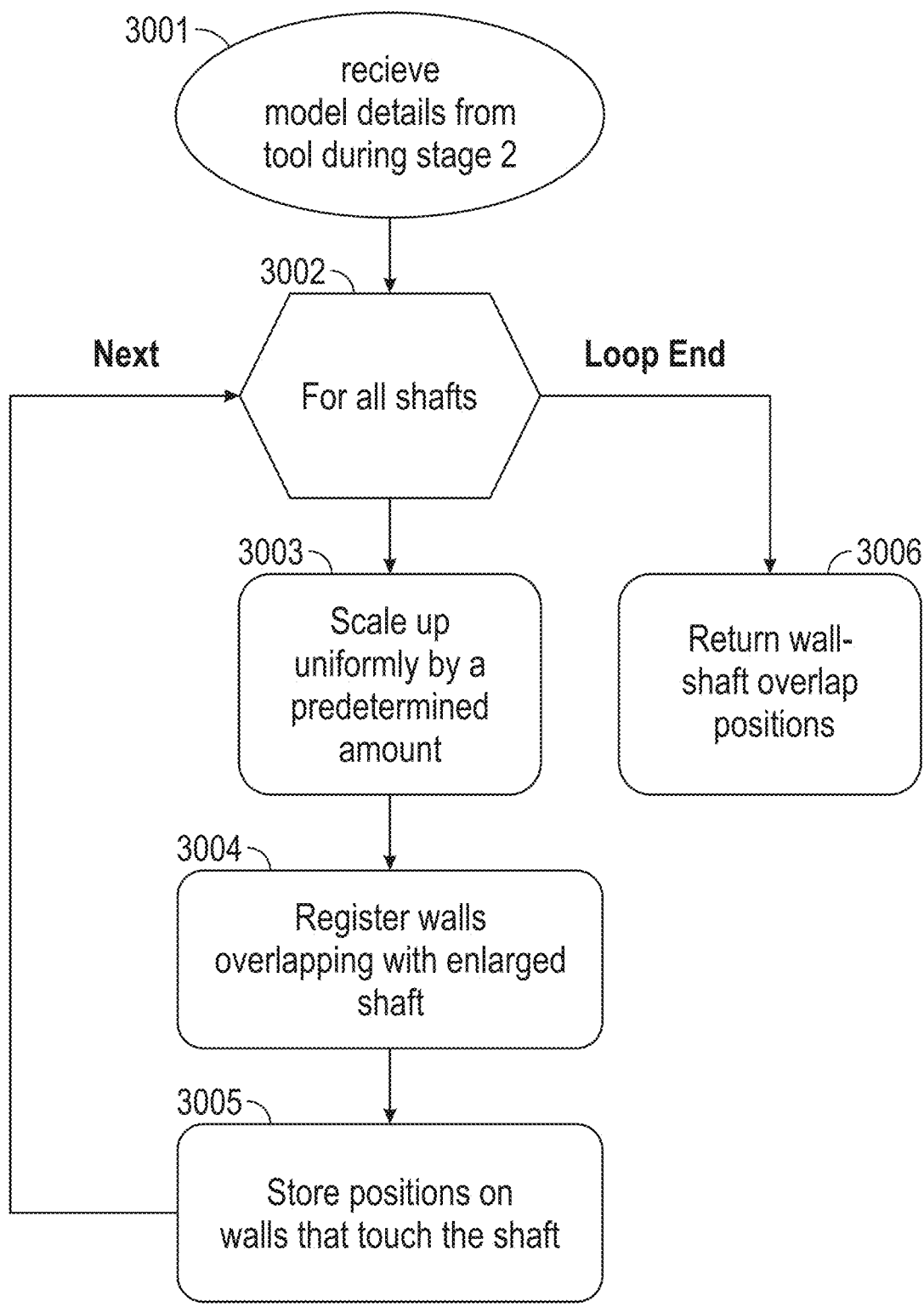

FIG. 30 is a simplified flowchart illustration of a method for performing registration of changes to walls' finish layers due to the existence of a shaft.

Figure 31:
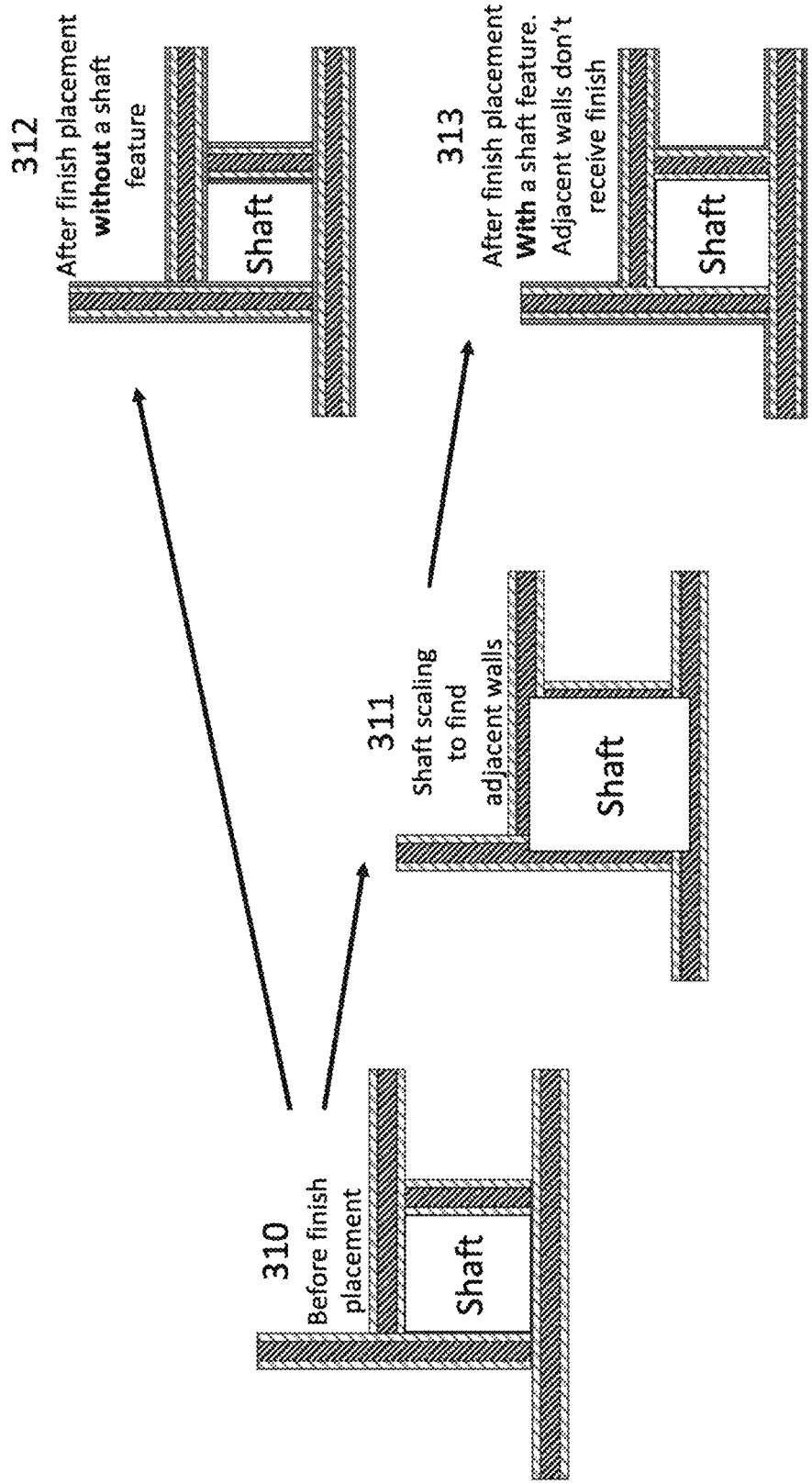

FIG. 31 illustrates a process of finish placing with and without (262) the shaft feature. The shaft is temporarily scaled to coincide with the walls around the shaft. Then these parts of the wall do not receive a finish layer.

FIG. 32 is a top-level simplified flow diagram illustration of a method for detailing walls, according to certain embodiments.

Figure 33:
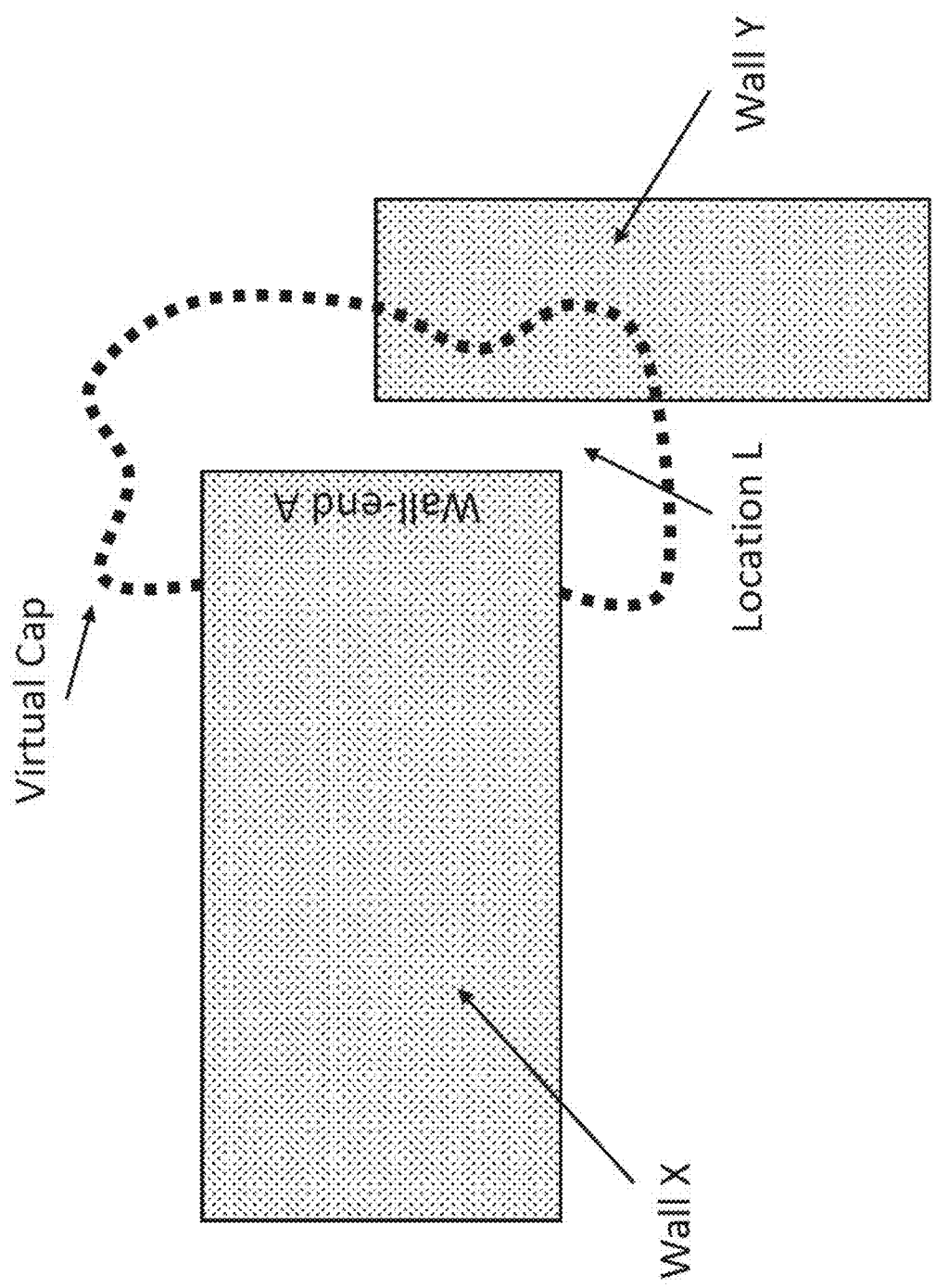

FIG. 33 is a pictorial illustration of a wall extended virtually by adding a cap aka virtual cap to at least one end of the wall.

Computational, functional or logical components described and illustrated herein can be implemented in various forms, for example, as hardware circuits such as but not limited to custom VLSI circuits or gate arrays or programmable hardware devices, such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software (e.g. for execution on suitable processing hardware such as a microprocessor or digital signal processor), firmware, hardware (using any conventional hardware technology such as Integrated Circuit technology), or any combination thereof.

Functionality or operations stipulated as being software-implemented may alternatively be wholly or fully implemented by an equivalent hardware or firmware module, and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware, in which case all or any subset of the variables, parameters, and computations described herein may be in hardware.

Any module or functionality described herein may comprise a suitably configured hardware component or circuitry. Alternatively or in addition, modules or functionality described herein may be performed by a general purpose computer, or more generally by a suitable microprocessor, configured in accordance with methods shown and described herein, or any suitable subset, in any suitable order, of the operations included in such methods, or in accordance with methods known in the art.

Any logical functionality described herein may be implemented as a real time application, if and as appropriate, and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

Any method described herein is intended to include, within the scope of the embodiments of the present invention, also any software or computer program performing all or any subset of the method's operations, including a mobile application, platform or operating system e.g. as stored in a medium, as well as combining the computer program with a hardware device to perform all or any subset of the operations of the method.

Data can be stored on one or more tangible or intangible computer readable media stored at one or more different locations, different network nodes, or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

FIG. 32 is a summarizing simplified flow diagram illustration of a method for detailing walls, according to certain embodiments. The method may be used standalone, or the operations thereof, or any subset of the operations, may be used to implement any of the embodiments which have been outlined above or will be described herein.

The method of FIG. 32 may include all or any subset of the following stages, suitably ordered e.g. as shown:

Stage 0. Typically, the system and method herein are suited for, inter alia, any system which includes a pre-fixed or pre-determined set of wall types.

A user places or positions walls (e.g. generates a 1:100 drawing); typically each wall is selected by the user from the pre-fixed or pre-determined set of wall types.

Typically, an input to the system herein includes a file which shows rough positioning of the walls. The file may for example include one or more 1:100 drawings, which may still be generic e.g. walls therein may still lack layers. Revit (e.g. the Revit wall tool) may be used to generate such a file; this link help.autodesk.com/view/RVT/2021/ENU/?guid=GUID-05BAFEAA-5186-484E-80F4-8D900C454748 describes a method for adding generic walls to a Revit building model.

Typically, an end-user aka modeler selects suitable walls from a walls family and roughly positions them to yield the planned building. Typically, every wall thus placed is later fabricated in a FAB in the course of physical fabrication of the house.

Stage 1 (may be manually initiated) may include all or any subset of sub-stages 1.10, 1.20, 1.30:

Sub-stage 1.10. e.g. as shown in FIG. 11, identifies wall junctions in the file which shows rough positioning of the walls, and typically defines each junction as an entry in a table or other data structure. Duplicates are typically erased. Typically, each wall junction is defined as belonging to one of a predetermined set of wall junction types or corners. Thus, typically, corners are identified (including classification of each corner as belonging to one of a predetermined set of corner types e.g. an L-corner or T-corner) before being registered (stored in a table or other data structure) or aligned; typically, each entry in a data table generated by the method of FIG. 11 is a corner.

It is appreciated that table/s, mentioned anywhere herein, are not necessarily the only possible data structure e.g. a list of dictionaries is also possible, and, alternatively, any data structure which enables one or (sometimes many) more entries to be efficiently registered (stored in a table or other data structure); typically, there is data on a wall's end and the walls that are close to it, to facilitate corner identification.

Sub-stage 1.20. Determination of the number of walls in a corner.

Corner type identification, e.g. as per FIG. 13.

Sub-stage 1.30 (e.g. as per FIGS. 14, 17, 18). identification of connection type aka corner type (e.g. straight, t-corner, l-corner, t-1 corner, 3-wall pi-corner, 4-wall pi-corner) and alignment. This sub-stage typically includes identifying each wall's "role" (penetrating or "penetration" walls vs.

"master" walls which are penetrated, e.g. as described herein with reference to FIGS. 15 and/or 23).

The user may use, say, CAD software for starting or activating the tool shown and described herein (any embodiment shown and described herein), e.g. using a virtual "wall detailer" button. After the end-user clicks and a menu for operating the tool opens, the end-user may be prompted to select walls that the tool may operate on (typically not all walls in an entire building project).

Stage 2. e.g. as shown in FIG. 20, finish placement includes all or any subset of the following operations:

Operation 2010: Retrieve wall type aka wall property e.g. either interior or exterior (operation 2007), e.g. a suitable CAD operation. This property is typically predefined by the architect modeling the project.

Operation 2020: add, to the wall, typically on both sides thereof, suitable finish layers according to corner type and wall type. For example, the building's exterior walls may receive, along their external surface, a thicker finish layer than the finish layer provided for the building's interior walls. Thus, logic may be provided to distinguish between wall surfaces which face inside, and wall surfaces which face outside. According to certain embodiments, walls are not painted onsite. For example, internal walls may be pre-manufactured with a finish layer e.g. an acrylic solid surface with a thickness of 6 mm, which obviates any need to paint the wall on site.

For example, if walls are related to an "L-type" corner, FIG. 22 (whose stages are illustrated in FIG. 24) is a method for generating exterior corner finish.

Stage 3 (e.g. as per FIG. 26-). Add CAD families to each identified or created corner. For example, penetration and/or void families may be added to various corners (as shown pictorially in the example of FIG. 25).

According to certain embodiments, the walls detailing tool herein is implemented as an add-in for suitable building design software such as Revit, in which case the add-in may be developed using Revit API. The add-in may then access the building design software's data repository and User Interface. According to certain embodiments, the walls detailing tool herein typically includes a dashboard with dropdown menus such as, for example, the menu of FIG. 26b herein. Typically, before initiating the tool, the end-user selects walls (e.g. from a ribbon, which may, say, be positioned atop the menu) and may place the selected walls on a drawing window (such as a Revit drawing area).

According to certain embodiments, each building project includes, represented in computer memory (which may be accessible to the walls detailing tool described herein), a family (e.g. digital repository) of plural wall types (the number of wall types need not be the same for all projects), and/or plural finish layers defined for the project and/or plural corner types defined for the project. The system typically knows how to distinguish one wall type and/or finish layer and/or corner type from the other. There need not be the same number of walls, finish layers and corner types, and indeed the number of each of these may vary between projects. The user places or positions various walls, and the system then typically identifies which is the next operation to proceed.

Typically, to make each corner seamless, an end may be added to a wall, wherein the end is of a specific material and thickness which matches the material and thickness of the wall that the end-portion completes.

Example: a particular project may store 216 wall ends, each of a specific material and thickness which matches the material and thickness of a wall of a given type, that the end-portion completes. This project may for example define 6 penetrating walls, 6 master walls and 6 types of corners. A structural element e.g. stud or sleeve, may be defined that connects certain types of walls.

Figure 1:
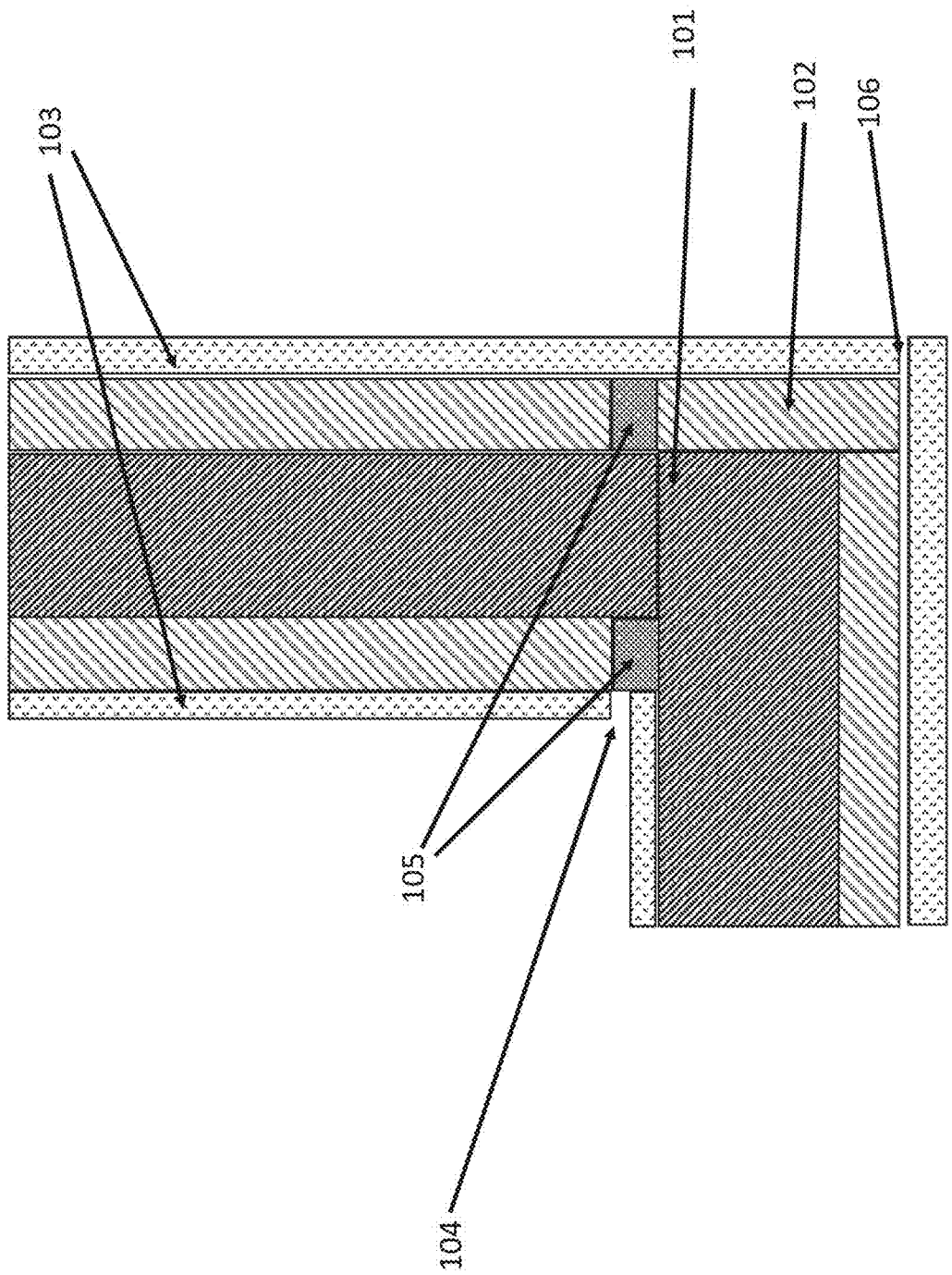
FIG. 1 illustrates detailed wall and corner components by way of example.

Turning now to FIG. 1, this is an example of an "L-type" corner between two walls, which may have been detailed in accordance with any of the embodiments herein. In FIG. 1, reference numeral 101 denotes walls aligned, reference numeral 102 denotes wall end completion, reference numeral 103 denotes finish layers on all walls, reference numeral 104 denotes a penetration family, reference numeral 105 denotes a void family, and reference numeral 106 denotes high detail.

There are various possible methods to connect walls and create corners. An "L type" corner, one possible corner, is created at a junction where two perpendicular walls meet. In FIG. 1, the walls are aligned perfectly (e.g. FIG. 1—reference numeral 101), have finish layers on them (e.g. FIG. 1—reference numeral 103) and the corners are detailed with correct CAD families. This is an example of a desired final result of detailing and may be done by the modeler, who is the professional that manually creates the CAD model of the planned building.

Typically, the modeler uses CAD families that have predetermined characteristics and/or properties. Such families can include wall types, finish types, and other families that are relevant for creating the model. They are placed and integrated manually according to plans. The use of the families is flexible and is not error-proof. Additionally, to obtain a specific result, the modeler needs to be familiar with the system and its requirements. The process is time-consuming and tedious.

Following are examples of families that may be used for creating a CAD model. A wall family may include a finite number of wall types that have been predetermined by the company that plans or fabricates the building, sometimes specially for a single project. The wall types can have different characteristics or properties, such as but not limited to all or any subset of the following:

Thickness: There are many reasons for walls to have different thicknesses. For example, sometimes due to different LGS studs' width like 3"⅝ or 6" for load bearing and other purposes, the architectural thickness may vary.

Number of layers: The number and identity of layers in a wall can change to yield certain possibly mandatory functions such as fire-resistance, noise resistance, thermal performance, and many more factors.

Materials: various materials for a wall's layers are possible.

Layer order: The order of layers can change for architectural, structural, or other reasons.

FIG. 2 shows 5 different wall types that comprise an example of a wall-family. For instance: The wall numbered 201 is a single-layered wall and is the thinnest. Wall 204 has four layers, one of them being just air.

Each company may have different wall types, comprised of different layers. Some of them may be based on wood, and others on concrete or steel. Also, the other layers may be different, but regardless of the building type, each project in each company may have its own finite family of wall types that is predetermined for that project, and may be defined as a wall family.

An additional family can be of wall-finishes. They too can be of different materials, colors, or thicknesses, to serve their purpose. For instance, an exterior cladding finish layer may serve as a rain-screen, and may impact the look of the façade and other factors such as solar-heat-gain and more. Therefore, the exterior cladding finish layer may have specific colors, thicknesses, materials assigned to it, and possibly more characteristics or properties, such as a dedicated air gap.

FIG. 3 demonstrates an example of a wall-finish family consisting of three types of finishes (numbered 301-303). As mentioned, the types can have different properties. For instance, finish number 301 has a dashed line at the top to illustrate an air gap between the finish and the wall on which the finish may be placed. It is also the thinnest of the three types.

Typically, CAD families may include each object or property used during the design. As software improves, more possibilities may become available. For instance, "Penetration families" (e.g. as shown in FIG. 4) and "void families" (e.g. as shown in FIG. 5) can be implemented to save time, even when modelling manually.

A penetration object is a cut or an opening in the finish layer that can be used for a connection of a penetrating wall, or to prevent finish overlaps. Reference numeral 401 in FIG. 4 shows a penetration that cuts a finish layer to prepare space for a penetration wall connection. Reference numeral 402 shows a penetration that cuts the ends of finishes to remove overlapping and detail a corner.

A void family is a family of objects that are supposed to be placed near wall connections at corners by allocating a predefined space for fire-blocking sound proofing or other functions. FIG. 5 shows an example for the addition of a void object to an "L-type" corner.

Additionally, "behind the scenes" actions are typically taken into account. For instance, CAD modelling may require group joining and locking of objects and family instances to each other for order, future use, and editing. The holistic approach for creating an automation tool may integrate and apply all or any subset of these requirements. The families comprising the architectural model create diversity that makes modelling and detailing non-trivial.

Additionally, geometries of buildings and interior spaces can be diverse, and the final output varies considerably.

When modelling manually, the modeler can use personal judgement to deal with modeling challenges. The drawbacks of this approach have already been described. An automation tool can be designed to overcome such drawbacks. As an example, for geometry possibilities that complicate manual or automated modeling, consider a bank of wall connections for a specific project (e.g. as shown in FIG. 6). Although they are not actual objects, wall connections may constitute a family of repeating geometries that have differences due to the variety of wall-families and finish-families comprising them. For convenience, each connection between two walls or more is termed herein a corner, although walls can also connect, to continue each other with no visible junction. A corner can include a changing number of walls, two, three and more. Alternatively or in addition, walls' connection geometry can increase the number of options and design alternatives. FIG. 6 shows an example of different possible corners for a project:

Corners 601 602 and 603 are all comprised of two walls.
Example 601 shows a straight connection.
Example 602 shows an "L-corner" in which the two walls are perpendicular to each other, and one corner intersects another.
Example 603 shows a "T-corner" in which the walls are perpendicular to each other, but one wall's ("penetrating wall") end intersects the second wall ("master wall") at a location other than the corner.
Corners 604 and 605 are comprised of three walls.
Example 604 shows an "L/T-corner" which is made of three walls and is similar to an L-corner, only it has an additional ("adjacent wall" numbered 3) wall that continues the master wall.
Example 605 shows a three-walls corner which is a "PI-corner". This corner is like a T-corner with an additional penetrating wall (number 2).

Example 606 shows a four-walls "PI-corner" which is geometrically similar to two L-corners (wall 1 with 3 and wall 2 with 4) which are mirrored and aligned next to each other. It is appreciated that computer aided modeling of a building typically requires use and application of different families and predetermined objects using a certain order and logic which may differ between companies, and even between projects. The automation of such a process has advantages e.g. as mentioned elsewhere herein.

The automated detailing tool shown and described herein is typically configured to receive walls that do not have any detailing and no relationship between them (e.g. FIG. 7 on the left) and perform actions of identification/classification of relationship between the walls, align them accordingly, and detail them using the families mentioned to get to the final detailed result shown on the right in FIG. 7. For different companies and construction technologies additional features may be provided e.g. as described herein with reference to FIGS. 27-30.

An example tool that can perform detailing is now described in detail with reference to FIG. 8 inter alia.

FIG. 8 shows an example of a flow-chart that shows operations, some or all of which the automation tool can perform, from receiving as an input walls that were placed close to each other but with no alignment (e.g. as shown in FIG. 7 left) to returning aligned and detailed walls as an output.

In FIG. 8, operation 801 is typically done manually. The modeler places walls at the desired location without any precision and without any additional actions. Actions may, for example, include translations such as but not limited to moving and/or rotating and/or scaling. Operations 802, 803 and 804 may be implemented as described elsewhere herein. Each stage is typically manually initiated, and any subset of the illustrated stages of operations may be performed, depending on functionality which may be required by the specific company using the tool, or for a specific project that, as defined, requires certain properties.

The tool's stages can be subdivided as follows:
Stage 1: In this stage the automation tool identifies corner types and aligns them e.g. as described herein. FIG. 9 shows an example of two walls before stage 1's operation, and after the completed process. FIG. 16 summarizes operation of stage 1 for a given example. Element 161 represents an initial state, and Elements 162-166 of FIG. 16 may respectively represent operation 1303 of FIG. 13, operation 1404 of FIG. 14, operation 1405 of FIG. 14, operation 1409 of FIG. 14, and operation 1410 of FIG. 14, respectively. Operations 1303, 1404, 1405, 1409, 1410 may, for example, each be included in stage 1.

On the left-hand side of FIG. 9 there are two walls that are intended to create an "L-corner" (see FIG. 6 for more corner options). The walls are not aligned. They have neither finishes, nor other families implemented on them, and they are not locked, joined, or grouped. Before initiating the tool, the modeler may be required to manually place them close to one another, within some threshold of closeness, having the intention to create a corner. The tool carries out the entire process, including identifying the intended corner type. If additional detailing is desired for certain types of corners, the tool adds the detailing to the process. For example, FIG. 10 shows an "L-type" corner for which the master wall ends in a way that exposes the wall's interior at the corner. The tool measures the width and length according to the desired result and adds a suitable cap. Examples for other methods are described herein.

To perform all (or any subset of) the actions mentioned, the tool may use several processes described herein (e.g. the processes of FIGS. 11, 13, 14).

After the walls for the detailing are selected and the tool is initiated, the first part of stage 1 starts with the tool finding corners and documenting them e.g. in a table. A suitable corner finding method is shown in FIG. 11. To find the corners, the tool may perform all or any subset of the following:

- Creates boundary boxes, aka bounding boxes, on both ends of each wall that has been selected. The ends are numbered (for instance 0 or 1) so that each wall end has a one-to-one identity.
- For each bounding box, the tool checks if one or more walls intersect the bounding box, and documents this as an entry in the table.
- Each table may include data on a bounding box and the walls intersecting the box.
- The tool then checks for duplicates that might exist due to the multiplicity of bounding box intersections, and cancels them out.
- Finally, the output is a table with one entry for each corner.

It is appreciated that the end-user may need not be required to leave walls non-touching. As long as the walls generated by the end-user are close enough to overlap in the "bounding box" that the tool creates, this embodiment can operate, to identify wall junctions, whether or not the walls contact one another.

In operations 1101, 1102 the user manually selects the walls that he or she wants the tool to operate on, and starts the tool. In operation 1103 the tool creates and aligns bounding boxes on each wall's end. Since each wall has two ends, the tool numbers them 0/1 randomly. The boxes are volumetric (e.g. as shown in FIG. 12) and have a predetermined size.

In operations 1104-1108, junctions are typically found.

In operation 1104 the tool creates an empty data table. Data on the corners may be later inserted to this table (or another data structure). Operation 1105 is a "for" loop which runs on all the bounding boxes. In operation 1106 if the current bounding box does not intersect any other walls, no further operation is needed. If it does intersect other walls, the method typically continues to operation 1107. In operation 1107 an entry is added to the table. The entry includes data on the bounding box and the intersecting walls, for example if wall "A"s bounding box number 1 intersects wall "B", the entry may appear as follows: {(A,1),(B)}. In operation 1108 the tool removes all the entries that are duplicates. For instance entry {(A,1),(B)} and entry {(B,0),(A)} include the same walls, and therefore are duplicates. The last one may be removed. Operation 1109 initiates part 2 of stage 1, with the table as an input.

FIG. 12 shows an example of a non-aligned "L-T corner" (as shown in FIG. 6) comprised of three walls. The figure shows the walls and their associated bounding boxes created by the tool. Arbitrarily, the bounding boxes are numbered A1, B1 and C0, respectively. The numbering scheme reflects a specific end for each wall. For each one of the bounding boxes that has walls intersecting with it, a table stores the data.

For the example in FIG. 12 the data may be stored in two entries as follows.

{(A,1),(B,C)}

{(C,0),(A)}

The first entry documents corner A1 and the walls intersecting with its bounding box: B and C.

The second entry documents corner C0 and the walls intersecting with its bounding box: A.

As seen in the figure, Wall B's boundary does not intersect with any wall, so data is documented for corner B1. Additionally, the two entries formed represent the same corner, so the last one may be deleted after the tool recognizes the multiplicity, and the first entry which includes more walls may stay and represent the corner. This way, each corner or walls connection may have a single entry related to that (say) corner. If several corners have been selected for the tool to operate on, the number of entries may finally be equal to the number of corners. For instance, if a room with four corners has been selected, the tool may end the wall finding operation with four entries in the table, one for each corner.

FIG. 13 shows the next part of stage 1, according to certain embodiments; all or any subset of the illustrated operations may be provided. In operation 1301 the input entries are the ones added in the method of FIG. 11. Operation 1302 describes a "for" loop in which each entry is tested. In operation 1303 of the for loop, the number of walls in the entry are counted, and the entry is sent to the respective part 3 according to the number of walls (operations 1304 1305 and 1306 for a two-walls, three-walls, or four-walls corner respectively).

Typically, one of the entries is taken each time and the number of walls in the corner is identified. For more than one corner, this is done several times until the number of walls participating in each corner is found. This operation is useful because if the detailing process varies for different corner types, this operation facilitates corner type identification. The flow-chart in FIG. 13 shows only the cases discussed, i.e. 2, 3 or 4 walls, however additional variations can be handled as well.

After the number of walls has been determined, the next part typically includes a dedicated algorithm (e.g., a list of dedicated operations to be performed on each of the participating wall individually, such as dimension changing, and on a group of walls defining the corner, such as exterior cladding) Detailing need not be the same for each corner. The corner geometry is a factor which may influence the tool's operation.

In the case of a two-wall corner, the method may be as follows (e.g. as shown in FIG. 14): Operations 1402, 1407 and 1409 may each be implemented using suitable CAD operations.

1402: most of the walls are parallel to either an X axis or a perpendicular Y axis. Operation 1402 checks whether both are parallel to the same axis, or not. 1407, 1409: it is appreciated that all alignment processes may involve elongating (or shortening) the "penetrating wall" to yield a side having a coordinate identical to a "master" wall's surface.

According to certain embodiments, alignment operations e.g. operation 1409 in FIG. 14, operation 1706 in FIG. 17, or operation 1804 in FIG. 18 include using a mouse to snap one wall's end to another wall's surface, and, responsively, the system may perform suitable scaling, translation, rotation or magnification.

Operation 1401 indicates that stage 1's process continues. In operation 1403, 1406 and 1408 corner types are identified and stored in the respective entry for the next processes. Operation 1404 is the identification for each ("first") wall of whether the first wall penetrates a second wall, or whether the first wall is penetrated (e.g. is a master wall). A method for performing operation 1404 is shown pictorially in FIG. 15 and as a simplified flow diagram in FIG. 23. In operation 1405 the distance from the penetration on the master wall to the end of the master wall is measured. If it is more or less than a predetermined threshold (e.g. as shown in FIG. 16, Reference numeral 164), this operation may distinguish between an "L-type" corner and a "T-type" corner. In operation 1410 the tool completes the end (adds a cap) of the master wall. As shown in FIG. 10, the alignment is leaves the master wall aligned to the second outmost layer of the penetrating wall. Then a "cap" is added to the wall in perpendicular. Its length is the same as the master wall's width. Its width is determined by the outermost layer's finish.

Typically, the tool checks whether the two walls are co-planar. If so, it may identify and save the connection type as "straight", and align the walls. If the walls are not co-planar, the tool may begin an additional identification process.

A suitable method for implementing the next operation is shown in FIG. 23. The tool may first (e.g. as shown in FIGS. 15, 23) identify which wall is the penetration wall and which is the master wall (e.g. as shown in FIG. 15). This is done by first, typically, making the walls temporarily thinner e.g. to prevent errors in identification. Then, e.g. subsequently, the walls may be temporarily elongated in turn at the connection side to find which wall penetrates which. For example, a first wall may be elongated for that wall to receive the same coordinates as a second wall that the first wall is supposed to touch. When a first wall penetrates another, second wall, the first wall is identified as a penetration wall and the second is determined to be a master wall. In a 3-wall corner of type L-T, the third wall may be called an adjacent wall (e.g. as shown in FIG. 6).

After finding the penetration wall and master wall, the master wall is tested to distinguish between an "L-type" corner and a "T-type" corner. If the master wall ends within a pre-determined threshold or less from the penetrating wall (for instance 1") then the type is identified as an "L-corner" (e.g. as shown in FIG. 16, Reference numeral 164). If it exceeds the predetermined threshold, then the wall is identified as part of a "T-type" corner. The walls are aligned according to their type. The walls alignment operation is the elongation or shortening of the walls' ends for them to create a contact and a uniform geometry (e.g. as shown in FIGS. 6, 16).

Additionally, the "L-corner" type may include the following process (e.g. as shown in FIG. 10).

The wall's outer layer's thickness is checked.
The master wall is then shortened by this length (e.g. as shown in FIG. 15 bottom center).
An end identical to the outer layer of the wall in material type and thickness is added to it (e.g. as shown in FIG. 15 bottom left, FIG. 10).

This is merely an example of a possible modeling that is fulfilled by the automation tool, and is typically case specific. For example, the case of a three-wall corner may use any suitable process; see e.g. FIG. 17. For a case in which there are more than two walls, the number of penetrating walls can be larger than one. For instance, in a 3-wall "PI-type" corner (e.g. as shown in FIG. 6) two walls penetrate one wall. The tool identifies (as in the two-wall case) penetrating walls and master walls. If the number of penetrating walls is two, a 3-wall "PI" corner is identified, and the walls are aligned.

If the number of penetrating walls is one, a "T-L type" corner is identified, and the walls are aligned.

Operation 1701 is the input of a corner entry from part 1. In Operation 1702 all the walls of the corners are identified e.g. as shown in FIGS. 15 and 23. Operation 1703 is an "if" statement. If the number of counted penetrating walls is not 2, in operation 1704 the corner is identified a "T-L type" corner and stored in the entry. If the number of penetrating walls is 2, in operation 1705 the corner is identified as a "PI-type" corner and stored in the entry. Operation 1706 is a CAD operation, such as wall alignment for alignment of both cases.

The case of a four-wall corner may use any suitable process; see e.g. FIG. 18. Once the process has been completed, the tool has typically recognized the corner to be a four-wall corner. In the specific example above, there is only one type of four-wall corner (e.g. as shown in FIG. 6), yet different implementations may include additional types. Nevertheless, in case there are more types, a classification can be done using the penetration test. The tool in this example verifies that there are two walls parallel to the X-axis and two walls parallel to the Y-axis. If they are so, a four-wall "PI type" corner is identified, and the walls are aligned accordingly.

Typically, the same alignment method (e.g. the same CAD operation/s as for operation 1706, may be used) irrespective of whether 2, 3 or 4 walls are present e.g. for any of the embodiments of FIGS. 14, 17, 18).

Operations 1802 and 1804 are CAD operations; typically it may be assumed that the walls used in the projects are parallel to X or Y axes. Operation 1801 is the input of a corner entry from part 1. In operation 1803 the "4-walls PI" type corner is identified and stored in the entry.

Stage 2: After the walls are aligned, the user can initiate the second stage (see stages flow-chart in FIG. 8). In this stage the automation tool places finishes on both surfaces of the walls selected. FIG. 19 shows an example of an "L-corner" before and after the second stage (left-hand side and right-hand side of the figure, respectively). The finish placement may use additional actions for different types of corners e.g. as described herein.

For FIG. 20 operations 2003, 2007, 2009 and 2010 are CAD operations.

2003—Redoing 1105 and 1106 and comparing X&Y positions of walls to ensure they touch.

2007—When creating the wall families (prior to the project), the user adds this property (wall type: exterior or interior) for each wall.

2009—Places finish on wall (as in real life) and stretches it in horizontal and vertical directions by scaling to same dimensions as the wall (FIG. 21 shows a case in which the user decides that the finish vertical end needs to be shorter).

In operations 2001 and 2002 the user selects walls for the tool to operate on and typically initiates a stage of the wall detailing process e.g. manually, say via a "start" button.

Operation 2004 typically comprises performing stage 1 in case it becomes apparent (e.g. in operation 2003) that stage 1 was not carried out on the selected walls.

Sometimes, e.g. in cases where the building's walls have already been placed manually, only stages 2 and 3 are believed to be needed and stage 1 may have been skipped, since, typically, each of stages 1, 2, 3 can be carried out independently. Typically, in operation 2003, the tool verifies that the selected walls have passed stage 1, thus checks whether the walls are already positioned and aligned.

In operation 2005 a "for" loop runs on all walls, to add finish. Operation 2008 may include additional operations. For instance, if the walls are related to an "L-type" corner, a sub-stage method that may be used for the finish detailing can be found in FIG. 22. The visual operations can be seen in FIG. 24, where the first, middle and last (left, center and right) elements correspond respectively to operations 2205, 2206 and 2207 in FIG. 22.

Typically, when stage 2 begins, the tool first verifies (e.g. operation 2003 in FIG. 20) that the alignment stage has been carried out on the selected walls. If this is not so, then the method typically automatically goes back to stage 1 (operation 2004), and returns to stage 2 only after the walls have been aligned. Then, for each wall, finish layers may be placed on both sides (operation 2009). The method typically uses the data in the model to test (operation 2007) whether a wall is interior or exterior. If it is interior, then the tool may place an interior finish type on both wall's sides (operation 2009). If the wall is exterior, then the tool again may use data from the model (according to the wall's layers) to identify the exterior side. The method typically then places different finish types from the finish family (e.g. as shown in FIG. 3) on the exterior side and interior side of the wall (operation 2008) and performs a join function (operation 2010 in FIG. 20) on the finishes and the wall. FIG. 19 shows an exterior facing corner before (left) and after (right) finishes were placed on the corner. It is appreciated that the finishes are different for each side of the walls. The placing of finish layers may include stretching a finish family on the entire wall surface. However, more detailing and precision may be employed to get a final result. For instance, the required height of the finish is not necessarily up to the top of the wall. The user can select the finish height properties and set a default finish height. An example is shown in FIG. 21: the default setting for interior walls is set to a height which is lower than, rather than reaching the "top of", the assembly.

In stage 2, the tool details each corner according to its type (e.g. as shown in FIG. 6). As an example, FIG. 19 shows an "L-corner" before and after finish placement e.g. as per stage 2 herein. As described, e.g. with reference to FIG. 15) a wall which has been identified, e.g. as described herein, as a master wall, may be detailed accordingly e.g. may receive a cap at its end, whereas penetration walls may be detailed differently and, say, may not be capped at their ends. The addition of a finish cap may be desired as well. The tool's basic operation places finish on the walls without exceeding the walls' boundaries (e.g. as shown in FIG. 24 left side). Then, since the connection is "L-type" the tool may elongate the exterior finish on the penetrating wall to reach the end of the master wall (e.g. as shown in FIG. 24 middle). Then the tool may elongate the exterior finish on the master wall to reach the end of the penetrating wall's finish (e.g. as shown in FIG. 24 right side).

FIG. 22 illustrates a method for detailing a corner's finish for an exterior "L-type" corner; all or any subset of the illustrated operations may be provided. Operations 2202, 2203, 2205, 2206 are CAD operations.

Typically, operation 2202 comprises a lookup in the wall's properties.

Typically, operation 2203 (and operation 2205) include placing of a new object (a finish layer, which is geometrically like a thin wall), in parallel and close to the walls that are being detailed.

Typically, operation 2205 resembles operation 2203, except with dimensions relevant to the master wall's thickness, as shown; typically, thickness is a "property".

In the first operation, 2201 the relevant walls' entry is given as an input. Operation 2204 is described in FIGS. 15 and 23. In operation 2207 (as can be seen in FIG. 24), a cap is placed on the master wall's end. The cap's length may be equal or similar to the wall's width. The cap's width is typically determined by the relevant finish type.

Various methods in the tool may use identification of penetrating walls and master walls (and "adjacent" walls, if desired). FIG. 23 describes a flow-chart for an example method. Operations 2303, 2304 are CAD operations, e.g. change property: thickness (scale) and change property: length (scale), respectively.

Operation 2302 typically initiates a "for loop" for all the walls in the entry. Operation 2305 is an "if" statement that checks whether the current wall penetrates another wall. In operation 2306 the wall which is penetrating may be stored as a penetration wall, and the penetrated wall may be stored as a master wall.

Stage 3: In stage 3, e.g. as shown in FIG. 26, the tool adds CAD families to the created corners. FIG. 25 shows an example of before (left) and after (right) executing stage 3 on an "L-type" corner.

Any sort of user interface (e.g. as shown in FIG. 26*b*) may be used to implement operation 2601, e.g. a menu from which the user selects wall properties and/or corner properties. Any suitable wall properties (e.g., say, the wall's thickness, width, height, etc.) and corner properties, may be provided.

Example: a "void family" object that is inserted in a corner might be dedicated for fireproofing or for any other property (thermal, or sound insulation etc.). In this case, typically, a user may choose a void object different to the default, and the tool, when operated, places the relevant void object.

Typically, the end-user can decide about any properties that are not predetermined. For example, for stage 2, a user may know that a certain finish layer needs to be at a height different to the height of the wall. If this is the case, the user may select a different height for the finish layer than for the wall, and, only then, start or initiate stage 2.

The identification of a penetrating wall, a master wall, and then finally the corner type, may be the same as was previously identified. Or, the tool may re-identify the corner type each time the tool seeks to identify which corner type a given corner belongs to.

In the menu of FIG. 26*b*, the end-user may select void and penetration types and the tool may place and/or scale the selected voids and/or penetrations automatically using any suitable actions.

The wall and finish types are typically properties predetermined for the object. FIGS. 2-3 illustrate various wall and finish types (from a given family). The corner type may be identified e.g. as described herein with reference to sub-stage 1.30. It is possible to use the corner entry which was already saved. Or, the corner type may be re-identified, regardless of whether or not stages 1 and 2 were performed. Operations 2607,2608,2609 and 2610 are CAD operations, e.g. operations 2607 and 2608 may include an object placement CAD operation, and operation 2610 may be a "LOCK" CAD operation. In operations 2601 and 2602 the user initiates the stage manually, after choosing the walls and setting properties (if penetrations or voids need to be different than the default). Operation 2603 is an "if" statement to verify that stage 2 was done on the selected walls. It is done using CAD operations e.g.

for each wall, a determination is made of whether or not a finish has been joined to that wall.

If stage 2 was not done on the selected walls, operation 2604 may reinitiate stage 2 and return to operation 2603. Then, at operation 2605 a "for loop" is initiated for all the chosen corners. All corners are detailed according to the next CAD operations and the stage ends.

Typically, the user initiates the stage, then the tool first checks if the selected walls have already have finish layers added to them. If not, then the tool may first return to the second stage before continuing. If the selected walls do have finishes placed on them, then the tool may test for any created corners. For each corner it may use the data on the corner, wall and finish types to choose suitable penetration, and void families (e.g. as shown in FIG. 1—reference numerals 104,105 respectively); then the objects may be "locked" to the wall to prevent problems if future editing is done.

The penetration family (e.g. as shown in FIG. 4) is a family of cuts in finish layers. When a penetration is placed on a finish, the penetration cuts the finish. This acts to eliminate any overlap in the corners, or allows a penetrating wall to penetrate the finish on the master wall. Thus, typically, the penetration, when placed, clears a part of the wall's finish.

The void family (e.g. as shown in FIG. 5) includes objects that are supposed to have a function at the place of a wall connection. Typically, the void fills any gaps. First, an opening (see reference numeral 502) is created in the final layer (e.g. see numeral 501) of a wall (typically one of two three or four walls that are currently being detailed). The final layer is that which is visible when standing in the room (if the wall still lacks finish). The wall or layer may be made of a variety of materials and thicknesses, e.g. as shown in FIG. 2.

The opening typically comprises a penetration family that the tool has placed (see e.g. reference numeral 2608). Then a void object (e.g. see numeral 503) is placed at that point e.g. as shown in the Stage 3 operations of FIG. 26*a*. The void family objects can have functions such as fire blocking, noise prevention, thermal insulation, and more. Their height may be the distance from the bottom of the wall to the top.

All or any subset of the following additional features may be provided:

One additional feature, illustrated by way of example in FIGS. 27 and 28 respectively, is for scaling objects which are inserted in or on the walls of a project. In FIG. 27, a fire guard aka fire block is found. The guard's XYZ coordinates are checked and the guard is stretched in the Z direction to the top and bottom of the wall. Typically, the X/Y or Z special dimensions are compared to certain predetermined elevations. For instance, if an end-user puts an object "v" on a wall "w", one of v's dimensions may be changed to match the respective dimensions of "w". As an example, FIG. 27 shows a front view of a wall with an inserted "fire-block". A fire-block is an object that may be required by code or statute when connecting walls that have different fire-ratings. The fire-block may need to be placed in the wall, and its general height is unknown, since the height of the walls changes between one project and another. This feature allows the tool to elongate the fire-block or any other necessary object to the wall's height after the fire-block's existence and location have been identified automatically by the tool.

An additional example, which is logically the same, but practically different, is shown in FIG. 28. Consider a pattern that is to be printed on the wall's finish. The "printing pattern object" can be placed on the wall and then automatically stretched horizontally, vertically, or along any other route by the tool.

The second feature that the tool may provide is prevention of finish placement in shafts. A shaft can mostly be found as an object in CAM software, and is continuous through a height of several floors, sometimes from the bottom of the building to the building's top. A shaft can have different functions, so the shaft's size can vary. For instance, an elevator shaft can be large as opposed to a shaft intended for ventilation or other HVAC purposes. FIG. 29 shows a simplified front view of a three-floor building with a shaft.

A shaft need not include a finish layer, but when using an automation tool such as the one described herein, the walls surrounding the shaft may, by default, obtain a finish layer in the second stage. FIG. 31 shows a part of a floorplan before (reference numeral 310) and after (reference numeral 313) the finish layer addition. Reference numeral 312 shows the addition of the finish layer without taking in account the shaft. It is visible that the shaft was surrounded by finish on all its sides. The added feature can help identify the walls at the shaft's boundary by temporarily scaling up the shaft and checking for overlaps of the shaft with the shaft's surrounding walls. Reference numeral 311 shows the shaft after the shaft was made larger and an overlap was created. After the identification, the tool can avoid placing finish on the walls surrounding the shaft by stopping the finish placement before the shaft, and continuing finish placement after the shaft. Reference numeral 313 illustrates the finished floorplan with finish layers added on the walls beside the walls surrounding the shaft.

FIG. 30 describes a process for shaft detailing. Operation 3001 is the initiation of the process. A possibility is for this process to be a function that is called during stage 2, e.g. in case there is a shaft in the model. This way no manual initiation is needed. In operation 3002 a "for" loop runs for each shaft. A shaft is temporarily scaled up (operation 3003) to a desired predetermined amount. In operation 3004 walls in overlap with the shaft (e.g. as shown in FIG. 31 element 311) are identified, and in operation 3005 the positions of the shaft are registered (stored in a table or other data structure) for marking the shaft's position with respect to the neighbor walls. In operation 3006 the positions are returned. The tool can then skip finish placement between these given positions and so the shaft may not have finish upon the shaft's walls.

Any suitable method may be used to determine the type or classification of a given corner, such as an L corner, T corner, and so forth, e.g. as shown in FIG. 10 and as described herein. For example, the software may add a virtual cap to at least one end of at least one virtual wall, thereby to extend the size of the virtual wall. Then, if the virtual cap of a Wall X, touches or penetrates a Wall Y, this indicates a corner at the location which touches or penetrates. The type of corner typically depends on what touches what and/or in which direction. For example, if wall X is horizontally oriented (where wall X's orientation is typically included in wall X's records or description) and wall Y is vertically oriented (ditto) and X cap and Y cap overlap to some degree or to a given degree, then the corner may be classified as an L type corner.

Typically, the size of the virtual cap corresponds to the distance between walls, which a human user would need to leave, on her or his screen, between walls that are intended to be a corner.

The term "cap" may be any geometric shape and typically extends a coverage region of another object, typically overlapping its edges. A cap may be of a predefined shape and/or size relative to the object itself e.g. if rectangular, the cap's two dimensions may be respectively smaller and larger than corresponding dimensions of the object. The cap is termed virtual because it is created and used by the software but typically has no physical equivalent.

An example cap, added to the right end of an object of dimensions L×H square units, is shown in FIG. 33 where the object or wall is a rectangle (dimensions L×H square units, where L>H), and the cap is also a rectangle (dimension U×V square units, U<L and V>H). The cap overlaps the rectangle at one of its edges, and is positioned symmetrically relative to the main axis of the object. However, the cap may be otherwise shaped and positioned.

It is appreciated that terminology such as "mandatory", "required", "need" and "must" refer to implementation choices made within the context of a particular implementation or application described herewithin for clarity, and are not intended to be limiting, since, in an alternative implementation, the same elements might be defined as not mandatory, and not required, or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order, including simultaneous performance of suitable groups of operations, as appropriate. Included in the scope of the present disclosure, inter alia, are machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented, e.g. by one or more processors. The invention shown and described herein may include (a) using a computerized method to identify a solution to any of the problems or for any of the objectives described herein, the solution optionally including at least one of a decision, an action, a product, a service or any other information described herein that impacts, in a positive manner, a problem or objectives described herein; and (b) outputting the solution.

The system may, if desired, be implemented as a network—e.g. web-based system employing software, computers, routers and telecommunications equipment, as appropriate.

Any suitable deployment may be employed to provide functionalities e.g. software functionalities shown and described herein. For example, a server may store certain applications, for download to clients, which are executed at the client side, the server side serving only as a storehouse. Any or all functionalities, e.g. software functionalities shown and described herein, may be deployed in a cloud environment. Clients, e.g. mobile communication devices such as smartphones, may be operatively associated with, but external to the cloud.

The scope of the present invention is not limited to structures and functions specifically described herein, and is also intended to include devices which have the capacity to yield a structure, or perform a function, described herein, such that even though users of the device may not use the capacity, they are, if they so desire, able to modify the device to obtain the structure or function.

Any "if-then" logic described herein is intended to include embodiments in which a processor is programmed to repeatedly determine whether condition x, which is sometimes true and sometimes false, is currently true or false and to perform y each time x is determined to be true, thereby to yield a processor which performs y at least once, typically on an "if and only if" basis e.g. triggered only by determinations that x is true and never by determinations that x is false.

Any determination of a state or condition described herein, and/or other data generated herein, may be harnessed for any suitable technical effect. For example, the determination may be transmitted or fed to any suitable hardware, firmware or software module, which is known or which is described herein to have capabilities to perform a technical operation responsive to the state or condition. The technical operation may, for example, comprise changing the state or condition, or may, more generally, cause any outcome which is technically advantageous given the state or condition or data, and/or may prevent at least one outcome which is disadvantageous, given the state or condition or data. Alternatively or in addition, an alert may be provided to an appropriate human operator or to an appropriate external system.

Features of the present invention, including operations which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art, and particularly, although not limited to, those described in the Background section or in publications mentioned therein.

Conversely, features of the invention, including operations, which are described for brevity in the context of a single embodiment or in a certain order, may be provided separately or in any suitable sub-combination, including with features known in the art (particularly, although not limited to, those described in the Background section or in publications mentioned therein) or in a different order. "e.g." is used herein in the sense of a specific example which is not intended to be limiting. Each method may comprise all or any subset of the operations illustrated or described, suitably ordered e.g. as illustrated or described herein.

Devices, apparatus or systems shown coupled in any of the drawings may in fact be integrated into a single platform in certain embodiments, or may be coupled via any appropriate wired or wireless coupling, such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation, and is not intended to be limiting.

Any suitable communication may be employed between separate units herein e.g. wired data communication and/or in short-range radio communication with sensors such as cameras e.g. via WiFi, Bluetooth or Zigbee.

It is appreciated that implementation via a cellular app as described herein is but an example, and, instead, embodiments of the present invention may be implemented, say, as a smartphone SDK, as a hardware component, as an STK application, or as suitable combinations of any of the above.

Any processing functionality illustrated (or described herein) may be executed by any device having a processor, such as but not limited to a mobile telephone, set-top-box, TV, remote desktop computer, game console, tablet, mobile e.g. laptop or other computer terminal, embedded remote unit, which may either be networked itself (may itself be a node in a conventional communication network e.g.), or may be conventionally tethered to a networked device (to a device which is a node in a conventional communication network or is tethered directly or indirectly/ultimately to such a node).

Any operation or characteristic described herein may be performed by another actor outside the scope of the patent application and the description is intended to include apparatus whether hardware, firmware or software which is configured to perform, enable or facilitate that operation or to enable, facilitate or provide that characteristic.

The terms processor or controller or module or logic as used herein are intended to include hardware such as computer microprocessors or hardware processors, which typically have digital memory and processing capacity, such as those available from, say, Intel and Advanced Micro Devices (AMD). Any operation or functionality or computation or logic described herein may be implemented entirely or in any part on any suitable circuitry including any such computer microprocessor/s, as well as in firmware or in hardware, or any combination thereof.

It is appreciated that elements illustrated in more than one drawing, and/or elements in the written description may still be combined into a single embodiment, except if otherwise specifically clarified herewithin. Any of the systems shown and described herein may be used to implement or may be combined with, any of the operations or methods shown and described herein.

It is appreciated that any features, properties, logic, modules, blocks, operations or functionalities described herein which are, for clarity, described in the context of separate embodiments, may also be provided in combination in a single embodiment, except where the specification or general knowledge specifically indicates that certain teachings are mutually contradictory, and cannot be combined. Any of the systems shown and described herein may be used to implement, or may be combined with, any of the operations or methods shown and described herein.

Conversely, any modules, blocks, operations or functionalities described herein, which are, for brevity, described in the context of a single embodiment, may also be provided separately or in any suitable sub-combination, including with features known in the art. Each element e.g operation described herein may have all characteristics and attributes described or illustrated herein, or, according to other embodiments, may have any subset of the characteristics or attributes described herein.

The invention claimed is:

1. A method for designing buildings, the method comprising:
    a) providing a first plurality of digital representations of how a plurality of walls are relatively positioned, thereby to define a building geometry,
    wherein each wall of the plurality of walls belongs to a layered wall type selected from among a plurality of layered wall types;
    b) determining that a first wall of the plurality of walls is positioned within a threshold distance of a second wall of the plurality of walls;
    c) in response to determining that the first wall of the plurality of walls is positioned within the threshold distance of the second wall of the plurality of walls, using a hardware processor for classifying at least one portion of the building geometry, which includes at least a portion of the first wall and a portion of the second wall, as an individual junction between the first wall and the second wall belonging to one of a plurality of junction types;

d) detailing the individual junction including providing a second plurality of digital representations of each of the portions of the first and second walls in the individual junction;
e) manufacturing the plurality of walls in accordance with the first plurality of digital representations; and
f) assembling the first and second walls of the plurality of walls in accordance with the second plurality of digital representations.

2. The method of claim 1, wherein the detailing comprises selecting the second plurality of digital representations of each of the portions of the first and second walls respectively from a repository of wall portion digital representations, the repository including,
for each individual junction type from among the plurality of junction types and for each layered wall type from among the plurality of layered wall types,
a digital representation of a first portion of the layered wall type,
and digital representations, of each of a plurality of possible second portions, of walls whose layered wall types are selected from among the plurality of layered wall types respectively,
and wherein each of the plurality of possible second portions are configured to interlock, directly or indirectly, with at least the first portion of the layered wall type to yield a junction of the individual junction type.

3. The method of claim 2, wherein the repository includes, for at least one junction type from among the plurality of junction types, and for a wall of a first layered wall type from among the plurality of layered wall types, and for a wall of a second layered wall type from among the layered wall types, a digital representation of a physical member and wherein the walls of the first and second layered wall types interlock indirectly via the physical member.

4. The method of claim 3, wherein the walls of the first and second layered wall types interlock directly with one another, rather than interlocking only indirectly via said physical member.

5. The method of claim 1, wherein each of the second plurality of digital representations of the portions of the first and second walls are part of a digital representation of each of the first and second walls in their respective entireties.

6. The method to of claim 2, wherein the repository of wall portion digital representations includes a digital representation of a first wall portion and a digital representation of a second wall portion which is at least partly defined analytically as a function of the digital representation of the first wall portion.

7. The method of claim 2, wherein the repository of wall portion digital representations includes a digital representation of a first wall portion and a digital representation of a second wall portion which differs only parametrically from the digital representation of the first wall portion.

8. The method of claim 1, further comprising positioning walls intended to interlock with one another at within the threshold distance from one another rather than engaging one another, and wherein classifying at least one portion of the building geometry as an individual junction includes determining whether walls of the plurality of walls positioned within the threshold distance from one another, if extended toward one another, will yield a junction belonging to one of the plurality of junction types.

9. The method of claim 1, wherein at least one of the plurality of layered wall types includes a sequence of at least one of the following types of layers: a thermal insulation layer, a structural layer, an acoustic layer, a light gauge steel layer, a fire-rating or fireproof layer, a waterproof layer, and a finish layer such as a high performance acrylic coating layer.

10. The method of claim 1, wherein the portions of the first and second walls of the plurality of walls are configured to interlock with one another such that assembling the first and second walls of the plurality of walls in accordance with the second plurality of digital representations comprises interlocking at least said plural the portions of the first and second walls.

\* \* \* \* \*